(12) United States Patent
Yamagata et al.

(10) Patent No.: US 7,095,514 B1
(45) Date of Patent: Aug. 22, 2006

(54) IMAGE PROCESSING SYSTEM FOR PREVENTING FORGERY

(75) Inventors: Shigeo Yamagata, Yokohama (JP); Ryosuke Miyamoto, Urayasu (JP); Eiji Ohara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 818 days.

(21) Appl. No.: 09/628,023

(22) Filed: Jul. 28, 2000

(30) Foreign Application Priority Data

| Jul. 29, 1999 | (JP) | ................................. 11-215406 |
| Sep. 24, 1999 | (JP) | ................................. 11-270278 |
| Jan. 31, 2000 | (JP) | ............................. 2000-022961 |

(51) Int. Cl.
*G06F 15/00* (2006.01)
*G06K 1/00* (2006.01)

(52) U.S. Cl. ................... 358/1.14; 358/1.14; 358/1.15; 382/181

(58) Field of Classification Search ...... 358/1.11–1.18, 358/1.1, 1.9, 1.2; 355/201, 203; 382/7, 382/165, 181, 182, 135; 399/8, 366
See application file for complete search history.

(56) References Cited

U.S. PATENT DOCUMENTS

| 5,390,003 A * | 2/1995 | Yamaguchi et al. ........ 399/366 |
| 5,659,628 A | 8/1997 | Tachikawa et al. ......... 382/135 |
| 5,678,155 A * | 10/1997 | Miyaza ........................ 399/366 |
| 5,909,602 A * | 6/1999 | Nakai et al. .................... 399/8 |
| 5,949,555 A | 9/1999 | Sakai et al. |
| 6,052,479 A | 4/2000 | Hiraishi et al. ............. 382/162 |
| 6,185,321 B1 * | 2/2001 | Fukushima et al. ......... 382/135 |
| 6,259,811 B1 | 7/2001 | Tsuji ........................... 382/166 |
| 6,427,020 B1 * | 7/2002 | Rhoads ....................... 382/100 |
| 6,515,755 B1 * | 2/2003 | Hasegawa ................... 358/1.14 |
| 6,621,922 B1 | 9/2003 | Takaragi et al. ............. 382/162 |

FOREIGN PATENT DOCUMENTS

| EP | 0 711 061 A1 | 5/1996 |
| EP | 1 049 317 A2 | 11/2000 |
| JP | 07-212580 | 8/1995 |
| JP | 07-274021 | 10/1995 |
| JP | 8-139906 | 5/1996 |
| JP | 09-018708 | 1/1997 |
| WO | WO 98/44719 | 1/1995 |

* cited by examiner

*Primary Examiner*—King Y. Poon
*Assistant Examiner*—Thierry L. Pham
(74) *Attorney, Agent, or Firm*—Fitzpatrick, Cella, Harper & Scinto

(57) ABSTRACT

Conventionally, it is impossible to securely and efficiently implement the judgment of specific images. In order to solve this task, an image processing apparatus according to the present invention is characterized in including an input unit (in these embodiments, this corresponds to, for example, the interface unit in FIG. 1) for inputting color image data, an judging unit (this corresponds to, or example, the forgery judging unit in FIG. 1) for judging whether the judgment of whether a color image composed of the color image data is a specific image has been already performed, and an image judging unit (this corresponds to, for example, the forgery judging unit in FIG. 1) for judging whether the color image include the specific image if the judgment has not been performed yet.

6 Claims, 27 Drawing Sheets

FIG. 11

WARNINIG

IT IS PROHIBITED BY LAW TO COPY IMAGE WHICH IS BEING READ.

READING OPERATION IS INTERRUPTED.

FIG. 13

WARNINIG

IT IS PROHIBITED BY LAW TO OUTPUT IMAGE WHICH IS BEING PRINTED.

PRINTING OPERATION IS INTERRUPTED.

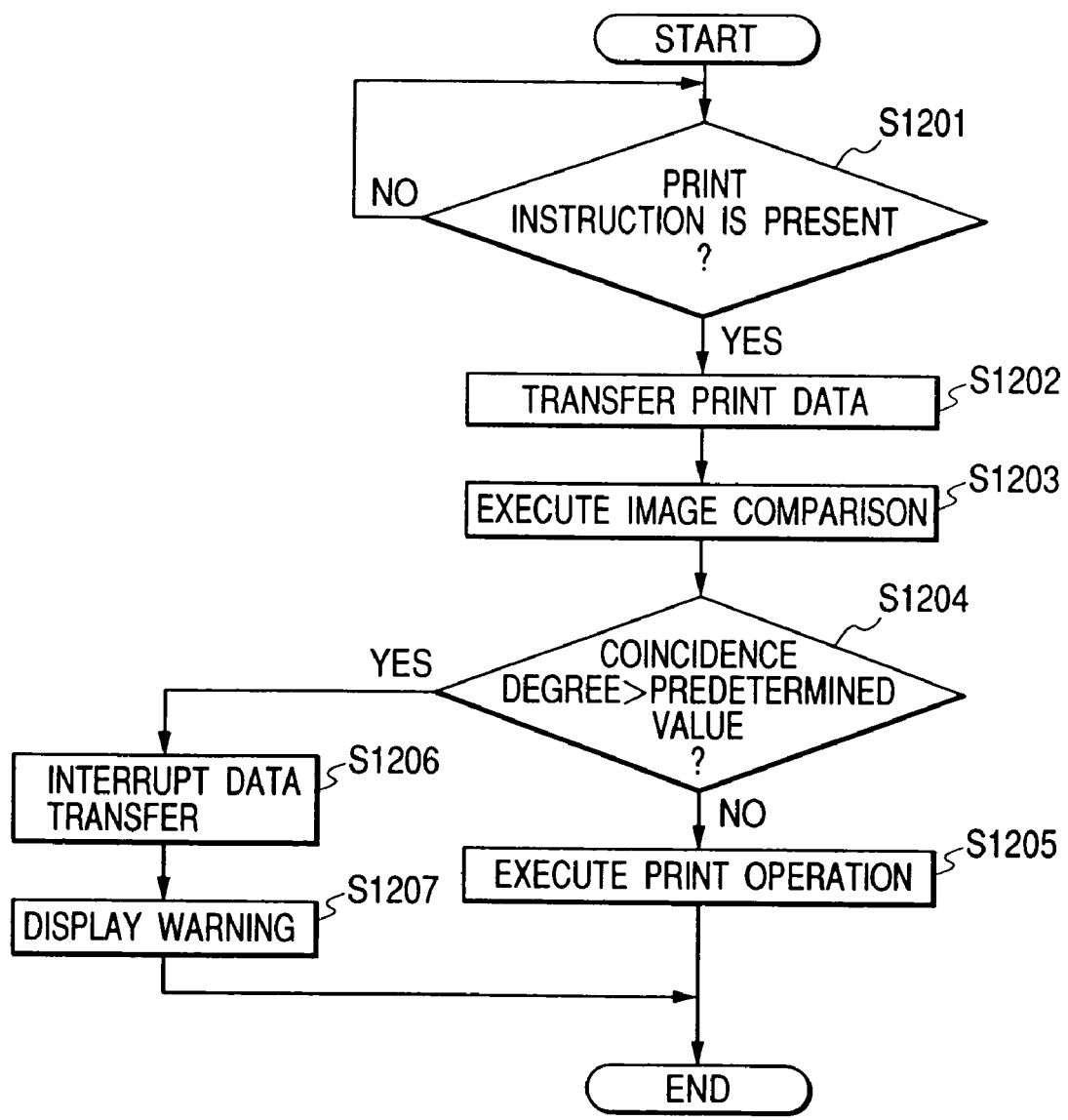

| SCANNER | SPECIFIC IMAGE 1 | JAPANESE YEN BANK BILL |
|---|---|---|
| | SPECIFIC IMAGE 2 | AMERICAN DOLLAR BANK BILL |
| PRINTER | SPECIFIC IMAGE 3 | DEUTSCH MARK BANK BILL |
| | SPECIFIC IMAGE 4 | BRITISH POUND BANK BILL |

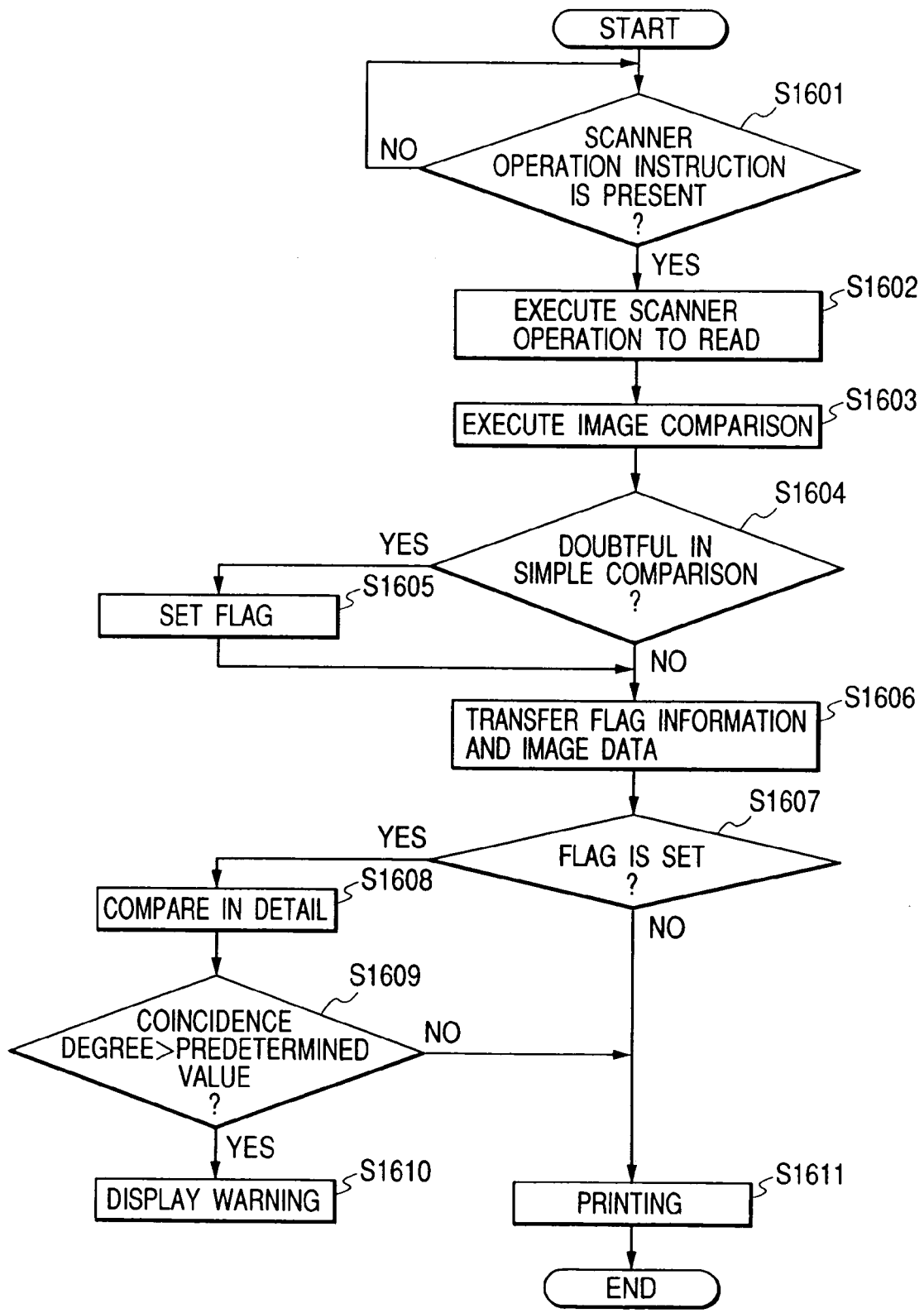

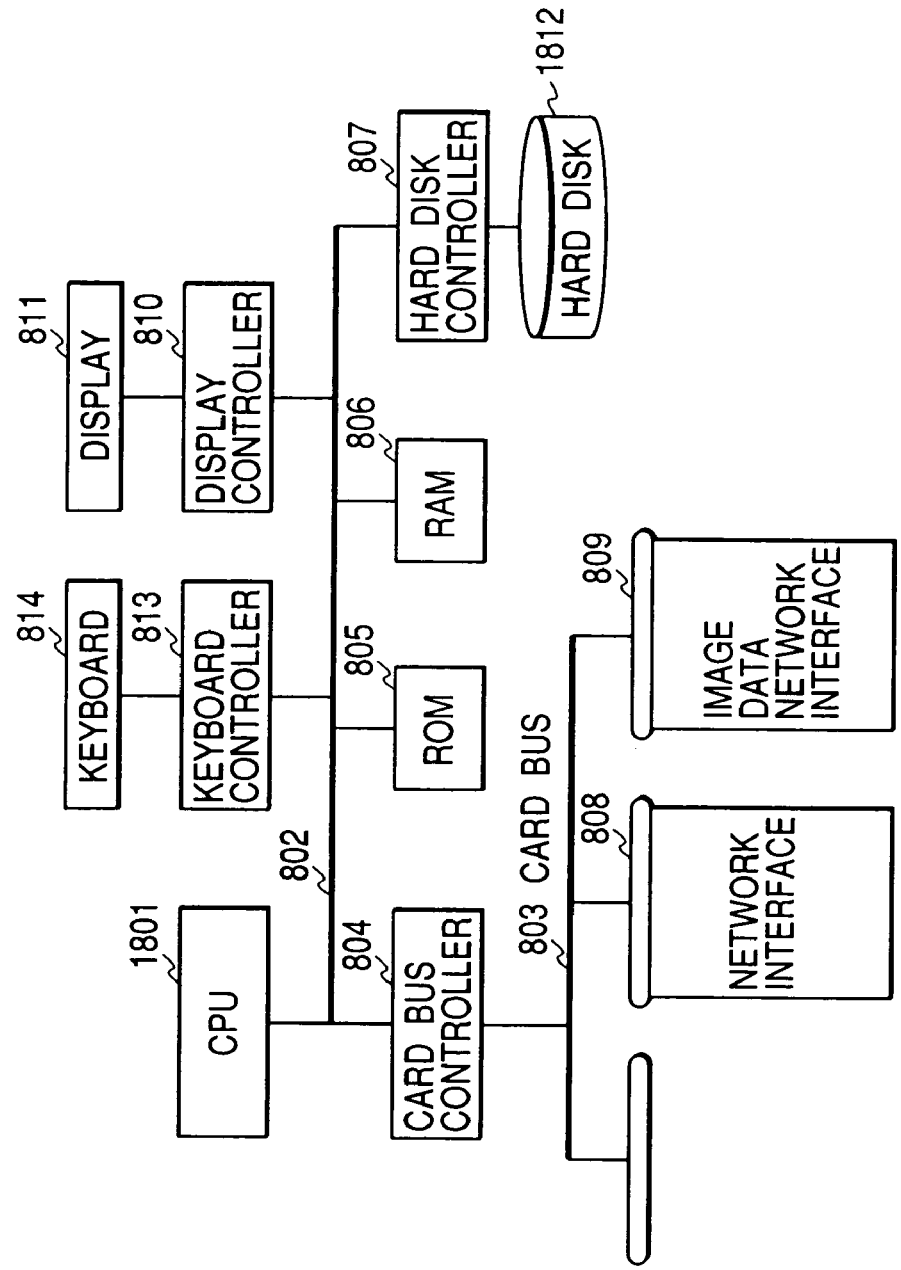

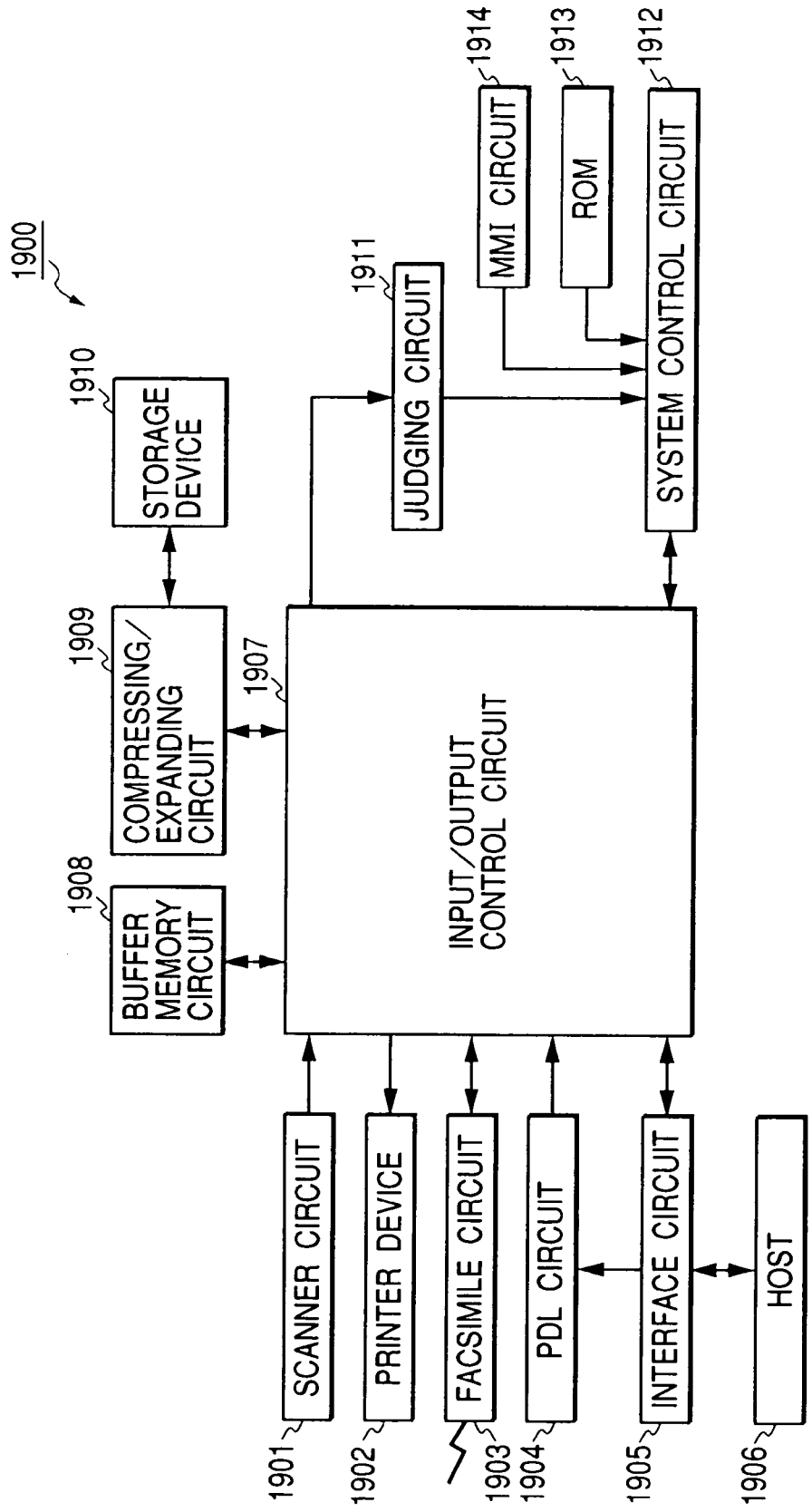

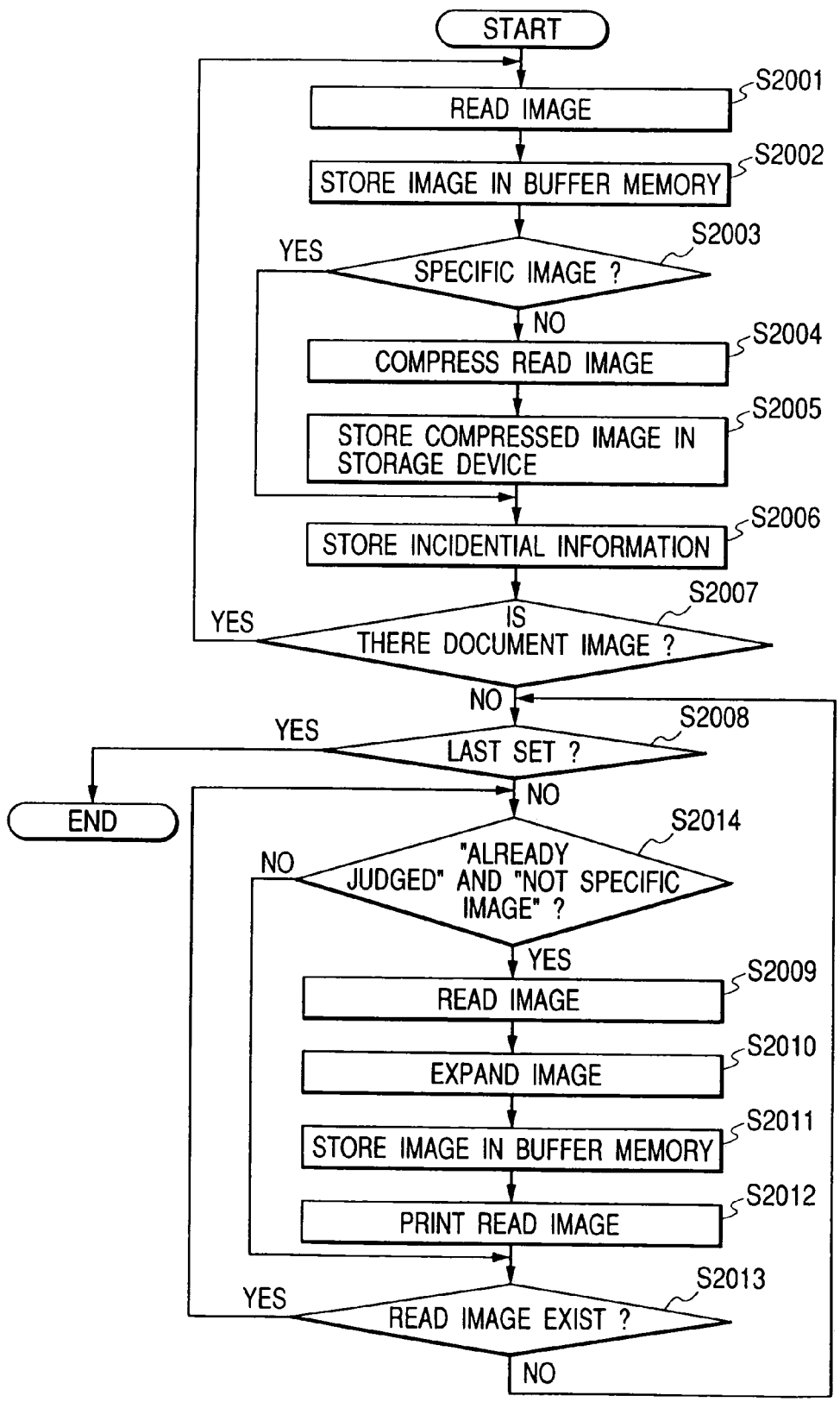

IMAGE PROCESSING SYSTEM FOR PREVENTING FORGERY

BACKGROUND OF THE INVENTION

1. Field of the Invention

The present invention relates to an image processing system, an image processing method, an image processing apparatus, and a storage medium for preventing forgery.

2. Related Background Art

Recently, performance of color image readers using each CCD or the like (hereinafter, color scanners) and color printers has been increased. Therefore, probabilities of making originals, which are copy-inhibited objects, copied and forged have increased by reading the originals, which are copy-inhibited objects, such as bank bills and securities with color scanners as image data, and outputting the image data to color printers.

In order to prevent such forgery, color-copying machines having a configuration in which a color scanner and a color printer are combined and having each forgery-preventing device that recognizes a copy-inhibited original and inhibits copying have increased.

Nevertheless, equipment having each forgery-preventing device is hardly present in spite of each function being provided, the function which is equivalent to a color copy machine by providing a personal computer (hereinafter, a PC) as an intermediary in case a color scanner and a printer is not unified.

On the other hand, since there are also plenty of originals that are copy-inhibited objects, there is a problem that load necessary for judging whether an original is a copy-inhibited object is large and processing speed becomes low. In particular, this problem becomes further severe in case a forgery-preventing function is realized with software processing using a program such as a scanner driver or a printer driver.

In order to judge these plenty of copied originals, plenty of time is necessary for repeatedly performing complicated processing and performing judgment processing. Therefore, there is a disadvantage that, for example, if a plurality of originals is copied into a plurality of copies, the performance for copying is remarkably dropped.

In addition, if judgment-processing time is shortened so as to increase the performance, kinds of copy-inhibited originals judgment of which can be performed are limited, and further misjudgment also increases.

SUMMARY OF THE INVENTION

The present invention has been made in view of the above points, and an object of the present invention is to efficiently perform the judgment of a specific image (copy-inhibited image) in a color input/output image.

Another object of the present invention is to relieve the burden that is caused by judgment processing of a specific original and to securely prevent forgery.

Still another object of the present invention is to provide a new function.

Other objects of the present invention will become more apparent with reference to the following embodiments and drawings.

BRIEF DESCRIPTION OF THE DRAWINGS

FIG. 2 is a flow chart showing the operation of a scanner unit in case a copy start switch is turned on;

FIG. 11 shows an alarm display screen;

FIG. 12 is a flow chart showing the operation of the printer;

FIG. 13 shows an alarm display screen;

FIG. 16 is a flow chart showing the operation of two-step image comparison;

FIG. 18 is a block diagram of an image data controller in the seventh embodiment;

FIG. 19 is a block diagram showing the configuration of an image input/output processing apparatus according to an eighth embodiment;

FIG. 20A is a flow chart of a processing program executed in a CPU of the image input/output processing apparatus according to the eighth embodiment;

DETAILED DESCRIPTION OF THE PREFERRED EMBODIMENTS

Hereinafter, preferable embodiments according to the present invention will be described in detail with reference to drawings accompanied.

First Embodiment

Figure 1:
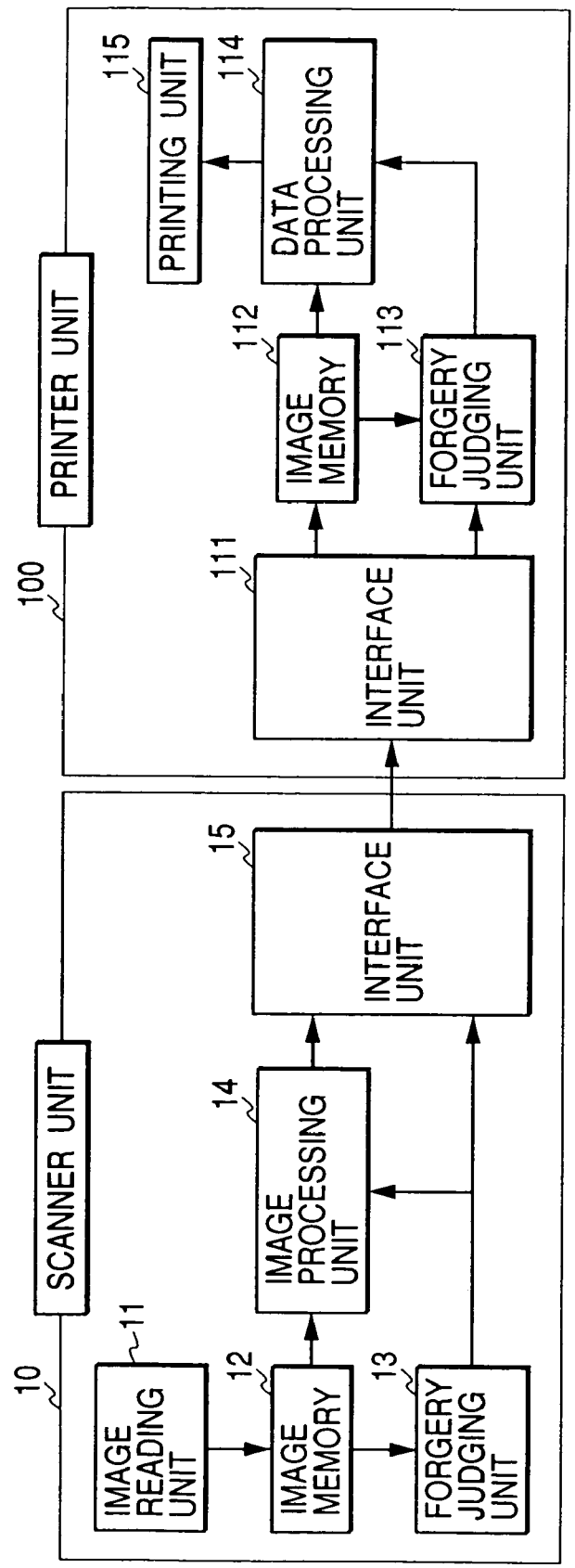
FIG. 1 is a block diagram of an image processing apparatus according to a first embodiment.

FIG. 1 is a block diagram of an image processing apparatus according to a first embodiment. In FIG. 1, a scanner unit 10 and a printer unit 100 are connected to each other through an interface unit. Interfaces are Centronics, RS-232C, USB, IEEE1394, and Ethernet interfaces, and there is no limitation on forms of interfaces.

An image reading unit 11 in the scanner unit 10 optically reads an original set in the scanner unit 10 and outputs three colors, that is, R, G, and B of color image data. Image memory 12 stores the color image data outputted from the image reading unit, and a forgery judging unit 13 is connected to the image memory 12. An image processing unit 14 is connected to the image memory 12, an interface unit 15 is connected to the forgery judging unit 13 and image processing unit 14, and data is sent from the scanner unit 10 to the printer unit 100 through the interface unit 15. In the printer unit 100, an interface unit 111 receives the data sent from the scanner unit 10, image memory 112 is connected to the interface unit 111, and a forgery judging unit 113 is connected to the interface unit 111 and image memory 112. A data processing unit 114 is connected to the image memory 112 and forgery judging unit 113, a printing unit 115 is connected to the data processing unit 114, and a color image is formed and outputted on recording paper in the printing unit 115. In addition, since the forgery judging units 13 and 113 adopt judging methods, which are different from each other, such as pattern matching, and color matching, it is possible to judge bank bills and securities such as traveler's checks.

Next, the operation of this embodiment will be described.

Figure 2:
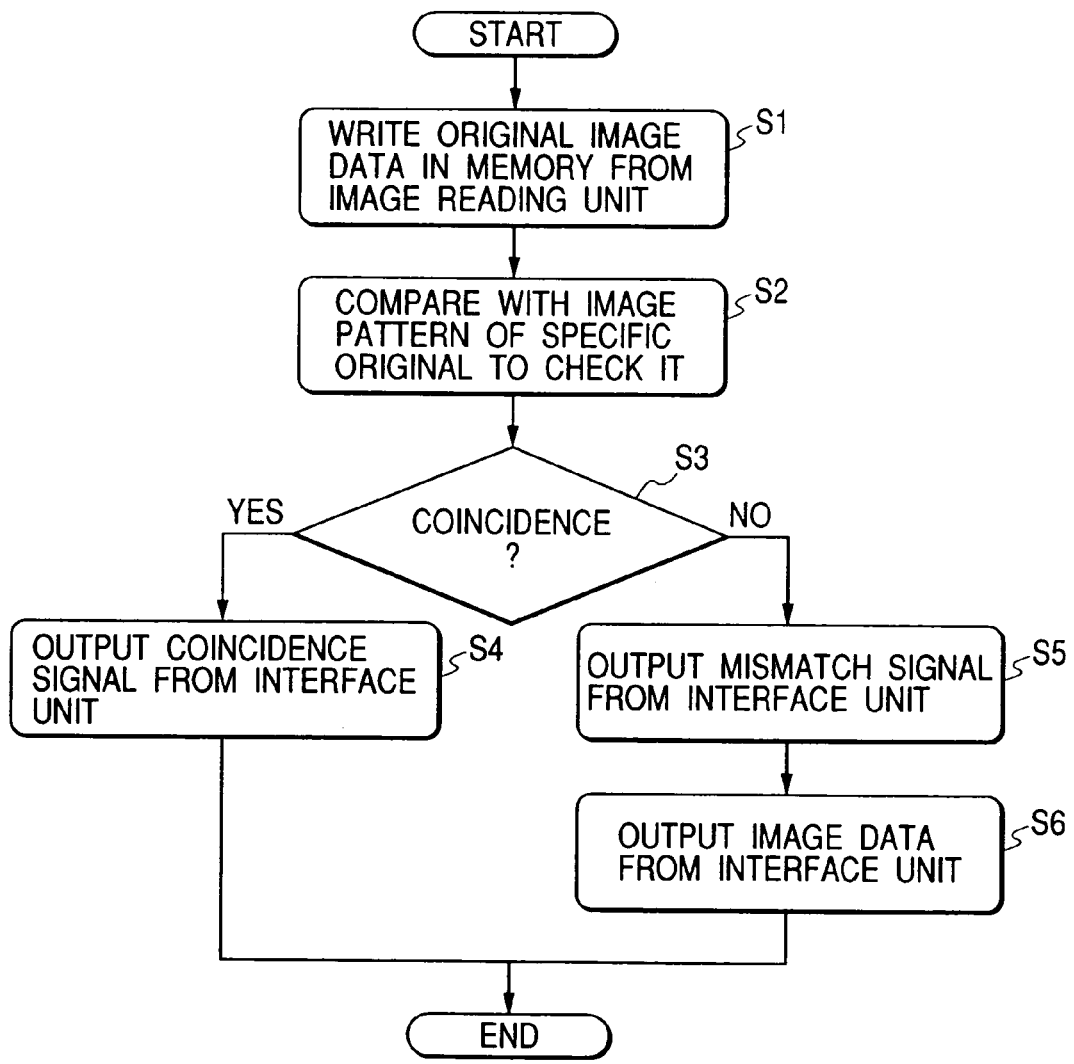
Figure 3:
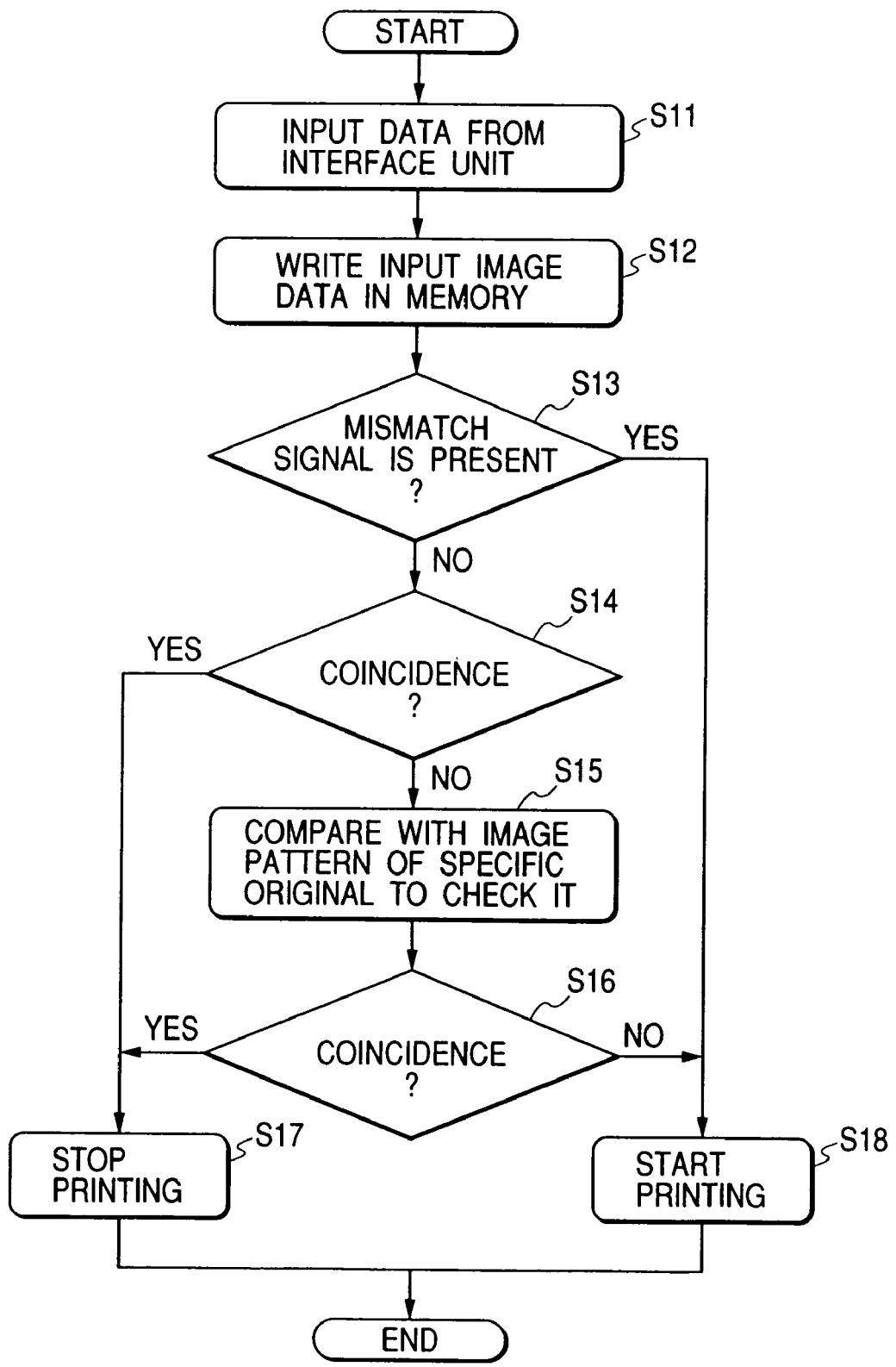
FIG. 3 is a flow chart showing the operation of a printer unit 100.

FIGS. 2 and 3 are flow charts showing the operation of the scanner unit 10 and printer unit 100 in case a copy start switch in this apparatus is turned on. If the copy start switch is turned on, the image reading unit 11 in the scanner unit 10 scans an image of an original set on a predetermined original table. Furthermore, the image reading unit 11 converts the image of the original into R, G, and B image data signals through an optical system and photoelectric conversion devices, and writes and stores the image data, which is converted, into the image memory 12 (step S1). In addition, the image memory 12 is page memory having data storage capacity corresponding to a page of original image.

Next, the forgery judging unit 13 refers to the image data stored in the image memory 12, and collates the image data with each image pattern of specific originals that are prepared beforehand (step S2). Next, it is judged whether a pattern of image data stored in the image memory 12 coincides with one of the image patterns of the specific originals (step S3). If both patterns coincide with each other at the step S3, the flow goes to step S4, and a signal showing the coincidence of the original image, which is read in the image reading unit, with the pattern of the specific original is outputted from the interface unit 15 to the printer unit 100.

If both patterns do not coincide with each other at the step S3, the flow goes to step S5, and a signal showing a mismatch is outputted from the interface unit 15 to the printer unit. Next, the image data stored in the image memory 12 is inputted to the image processing unit 14. The image processing unit 14 converts the image data signal, which is inputted, into four colors, that is, yellow, cyan, magenta, and black of image intensity signals (image density signals), and outputs the signals to the interface unit 15. The interface unit 15 outputs the image intensity signals inputted to the printer unit 100 (step S6). As described above, the scanner unit 10 outputs the original image intensity signals through the interface unit only if the pattern of the image data read from the original image does not coincide with the image pattern of the specific original.

Next, the operation of the printer unit 100 will be described with reference to FIG. 3.

The data signal is inputted from the interface unit 111 connected to the interface unit 15 in the scanner unit 10 to the printer unit 100 (step S11). The image data in the date signal inputted from the interface unit 111 is inputted to the image memory 112, and is stored in the image memory 12 (step S12).

Subsequently, the detected signal of coincidence or mismatch with the specific pattern that is outputted from the scanner unit 10 is inputted to the forgery judging unit 113, and first, it is judged whether the detected signal of mismatch (hereinafter, a mismatch signal) with the specific pattern is inputted (step S13).

If the mismatch signal is inputted, the image intensity signals read from the image memory 12 are inputted to the data processing unit 114. The data processing unit 115 converts the signals, which are inputted, into print data, the print data converted is outputted to the printing unit 115, and printing operation is started (step S18).

If it is judged at the step S13 that the mismatch signal is not inputted, the flow goes to step S14, and it is judged whether the detected signal of coincidence (hereinafter, a coincidence signal) is inputted. If it is judged that the coincidence signal is inputted, printing operation is stopped (step S17). If it is judged at the step S14 that the coincidence signal is not inputted, the forgery judging unit 113 refers to the image intensity data stored in the image memory 112, and collates and compares the image intensity data with each image pattern of the specific originals prepared beforehand (step S15).

Next, a result of the collation by the forgery judging unit 113 is judged at step S16, and if it is judged that both coincide with each other, printing operation is stopped (step S17). If it is judged that both do not coincide with each other, the flow goes to step S18, and the print data processed by the data processing unit 115 is outputted to the printing unit for printing operation to be started.

As described above, according to the first embodiment, by sending the result of the forgery judgment by the forgery judging unit in the scanner unit 10 to the printer unit 100, the printer unit 100 refers to the result of the forgery judgment inputted from the scanner unit to control whether the input image data is printed.

In addition, if the forgery judgment is not performed in the scanner unit, the flow goes from the step S14 to the step S15. In the above-described embodiment, such an example that the scanner unit has the forgery judging unit 13 is explained, and hence the flow never goes to the step S15. Nevertheless, only if a scanner unit not having a forgery judging unit in prior art is connected to the printer unit in this embodiment, the flow goes to the step S15. The step S15 shows forgery judgment processing performed in the printer unit. The printer unit is controlled so that the forgery judgment in the printer unit is performed only when both of the coincidence signal and mismatch signal that are the results of the forgery judgment are not inputted.

Therefore, if the result of the forgery judgment performed in the scanner unit is inputted to the printer unit, it is possible to increase throughput by immediately starting printing operation without performing the forgery judgment in the printer unit. Therefore, it becomes possible to increase throughput.

In the above-described embodiment, such an example that, in the image processing unit 14 of the scanner unit 10, the image data signal inputted is converted into four colors, that is, yellow, cyan, magenta, and black of image intensity signals is shown. In addition, the R, G, and B image signals are inputted to the forgery judging unit 13 of the scanner unit 10, and the yellow, cyan, magenta, and black image intensity signals are inputted to the forgery judging unit 113 of the printer unit 100. Nevertheless, the image data signal can be outputted from the interface unit 15 of the scanner unit 10 to the interface unit 111 of the printer unit 100 as R, G, and B signals without being converted into four colors, that is, yellow, cyan, magenta, and black of image intensity signals in the image processing unit 14 of the scanner unit 10.

In this case, the R, G, and B signals are inputted to the forgery judging unit 113 of the printer unit 100, and are converted into four colors, that is, yellow, cyan, magenta, and black of image intensity signals in the data processing unit 114 of the printer unit 100.

In addition, although the image memory of the scanner unit 10 is page memory in the above-described embodiment, it is not always necessary to be the page memory so long as there is memory capacity necessary for performing the comparison and collation with each image pattern of the specific originals that is used in the forgery judging unit 13.

Second Embodiment

Next, a second embodiment will be described. The second embodiment is such an example that the operation flow of the printer unit 100 in the first embodiment is modified, and this is shown in FIG. 4.

Figure 4:
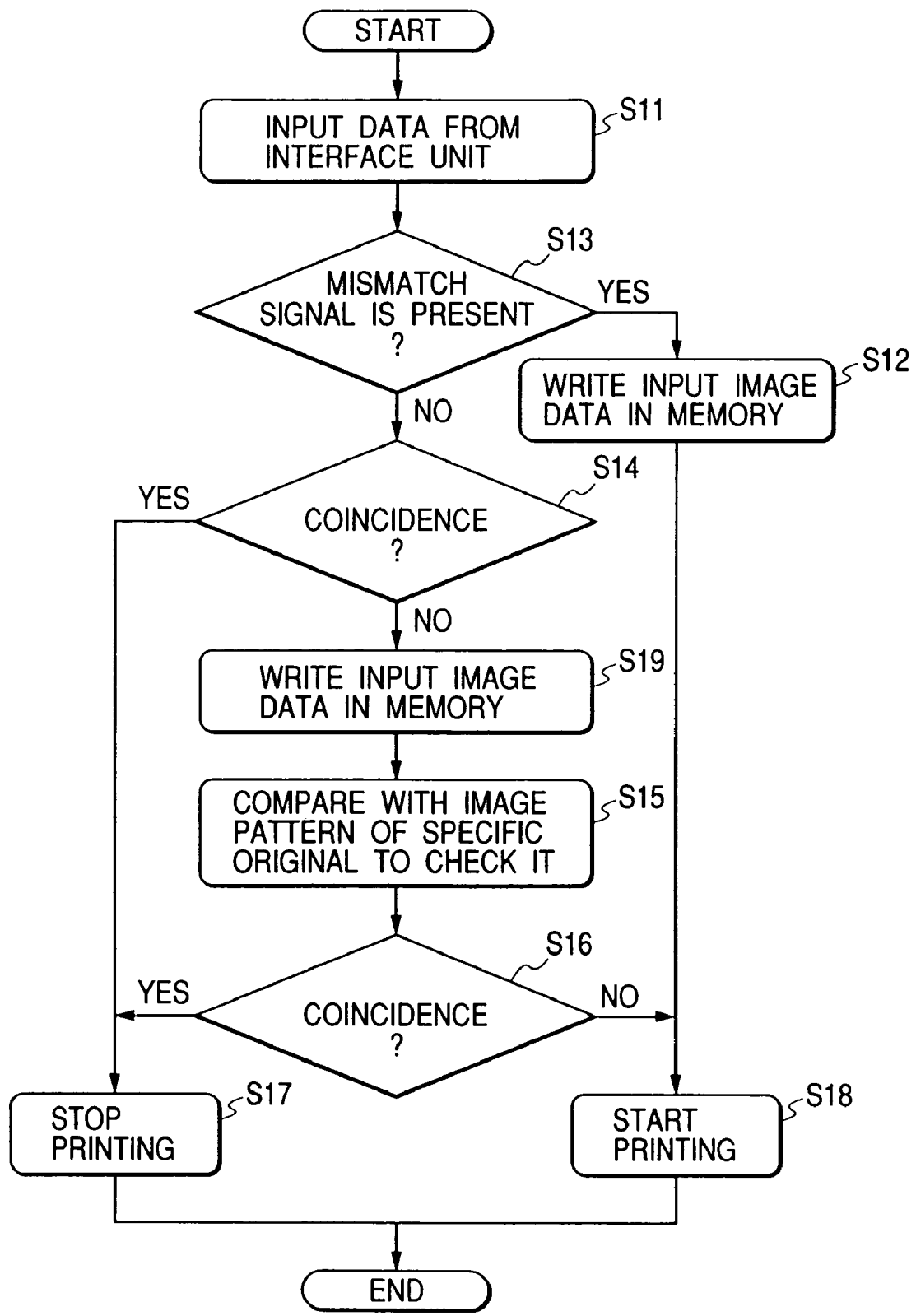
FIG. 4 is a flow chart showing the operation of a printer unit 100 in a second embodiment.

In FIG. 4, the printer unit 100 inputs a data signal, outputted from a scanner unit, from the interface unit 111 (step S11). Next, it is judged at step S13 whether a mismatch signal is present in the data signal inputted from the interface unit. If the mismatch signal is present, the flow goes to step S12, input image data is written in the image memory 112, and printing operation is started (step S18).

In addition, writing of the input image data in the image memory 112 that is performed at the step S12 is controlled so that, just after writing with volume required in the data processing unit 114 and printing unit 115 that are subsequent stages is completed, the flow goes to step S18, data is read from the image memory 112, and printing operation is started. In this case, the image memory 112 is used as data processing buffer memory of the data processing unit 114 and printing unit 115.

If the mismatch signal is not present at the step S13, the flow goes to step S14, and it is judged whether a coincidence signal is present. If the coincidence signal is present, the flow goes to step S17, and printing operation is stopped. If the coincidence signal is not present, the flow goes to step S19. Such a case that the flow goes to step S19 shows a case of forgery judgment being not performed in the scanner unit. At the step S19, a page of input image data is written in the image memory 112.

Next, the forgery judging unit 113 performs comparison and collation with each specific pattern at step S15 to judge at the step S16 whether the image data coincides with each specific pattern. If not coinciding, printing operation is started at the step S18, and if coinciding, printing operation is stopped at the step S17. In addition, if the printing operation is stopped at the step S17, error display showing that the data signal is not suitable for printing operation can be performed.

As described above, if a result signal of the forgery judgment in a scanner unit is inputted to a printer unit, it is controlled with the result signal of the forgery judgment in the scanner unit whether input data is printed. Furthermore, if the result of the forgery judgment is not inputted, the printer unit performs the forgery judgment. The operation is controlled so that the data signal is printed only if the printer unit judges that the image data does not coincide with a specific pattern.

As described above, by controlling the printing operation in the printer unit on the basis of the result of the forgery judgment performed in the scanner unit and controlling the printing operation on the basis of the result of the forgery judgment performed in the printer unit only if the forgery judgment processing is not performed in the scanner unit, it becomes possible to perform secure forgery judgment processing. Furthermore, duplicated forgery judgment processing is never performed in the scanner unit and printer unit, and hence it is possible to increase the throughput of printing operation.

Third Embodiment

Next, a third embodiment will be described. In the third embodiment, a scanner unit and a printer unit are connected via a network, which is different from the first and second embodiments where the scanner unit and printer unit are connected in one-to-one relation.

Figure 5:
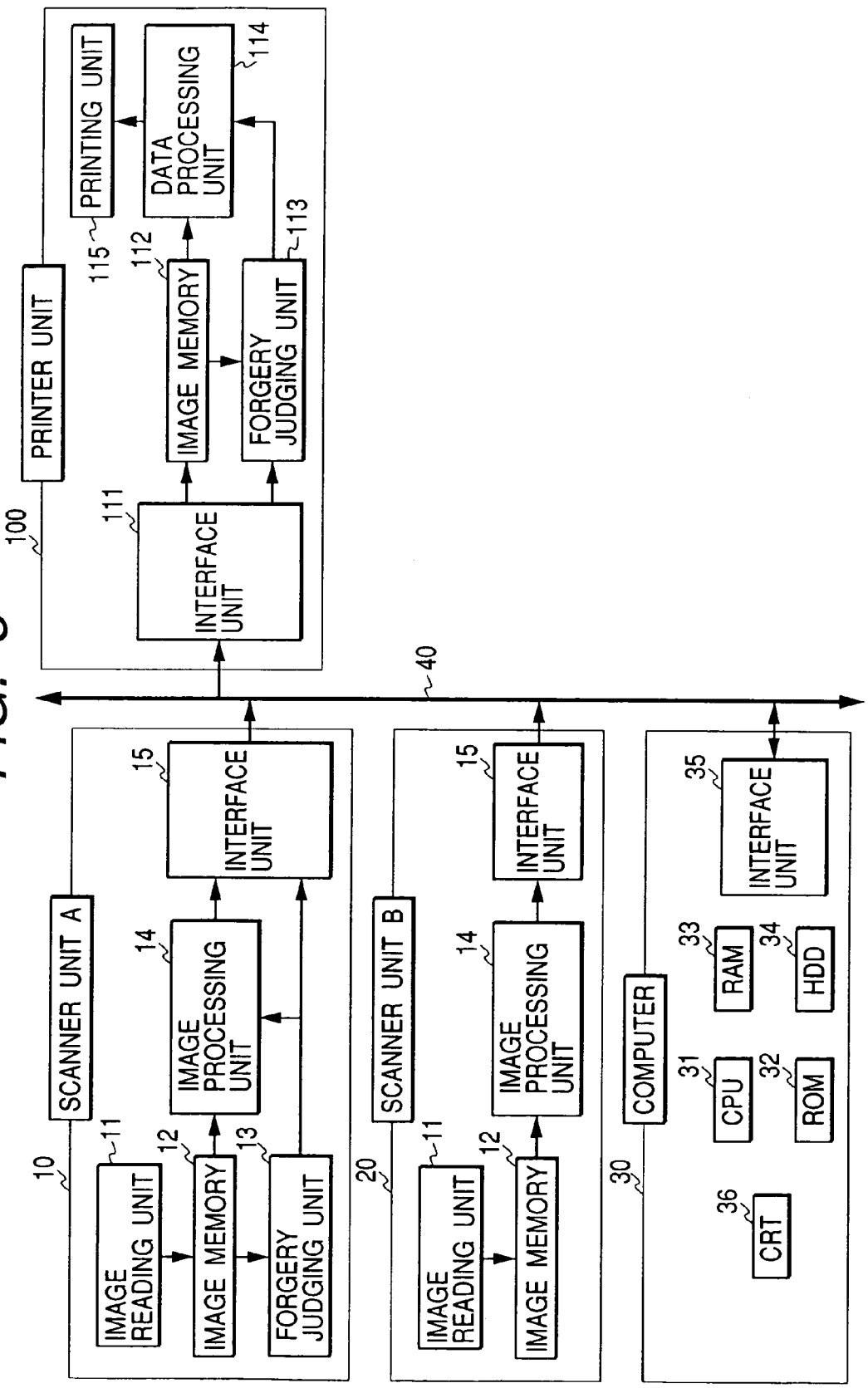
FIG. 5 is a block diagram of a third embodiment.

FIG. 5 is a block diagram of the third embodiment. In FIG. 5, a scanner unit-A 10, and a printer unit 100 have respectively the same functions as those of the scanner unit 10 and printer unit 100 that are described in the first embodiment. Therefore, the same reference numerals are assigned to the blocks having the same functions.

This embodiment is configured so that devices connected to a network cable 40 in FIG. 5 input and output each data signal between respective devices via the network cable 40. A scanner unit-B 20 in FIG. 5 is a scanner not having a forgery judging unit, and other components are the same as those of a scanner unit-A 10. In addition, a computer 30 in FIG. 5 is connected to the network 40.

Hereinafter, the operation of the third embodiment will be described.

As for the operation in the case of outputting an original image, read in the scanner unit-A 10, from the printer unit 100, as described in the above-described first and second embodiments, by judging a result of forgery judgment, performed in the scanner unit-A, in the printer unit 100, an image data signal is immediately printed and printing operation is stopped without performing duplicated forgery judgment processing in the printer unit 100.

In addition, in case the original image data read in the scanner unit-B not having the forgery judging unit is printed in the printer unit 100, forgery judgment processing in the printer unit 100 judges whether an input image data coincides with a specific image pattern. The input image data is printed only if not coinciding with the specific image pattern, and printing operation is stopped if coinciding. Therefore, it is possible not only to perform secure forgery judgment processing, but also to increase the throughput of printing operation without performing duplicated forgery judgment processing.

Next, the operation in the case of the computer 30 bringing in a signal, read from an original image, from the scanner unit-A and scanner unit-B 20 will be described.

The computer 30 sends a scanner operation instruction to the scanner unit-A 10 from the interface unit 35 connected to the network 40. The scanner unit-A 10 starts operation according to the flow shown in FIG. 2, described above, in accordance with the scanner operation instruction inputted from the interface unit 15. An image reading unit 11 in the scanner 10 scans an original image set on a predetermined original table, converts the original image into an image data signal through an optical system and a photoelectric conversion element, and writes image data, which is converted, in the image memory 12 to store it (step S1). The forgery judging unit 13 performs comparison and collation with the specific image pattern (step S2). If the original image data does not coincide with the specific image pattern, the interface unit 15 sends a mismatch signal (step S5), and sends the original image data (step S6).

The mismatch signal and image data that are sent from the interface unit 15 is not only inputted to RAM 33 in the computer 30 but also stored in a hard disk drive (HDD) 34. If the forgery judging unit 13 in the scanner unit-10 detects coincidence with the specific image pattern, the interface unit 15 sends a coincidence signal (step S4), and the interface unit 35 in the computer 30 takes in the coincidence signal, which is stored in the RAM of the computer 30.

In addition, if scanning operation is performed as the operation of the scanner unit 10 by an instruction from the computer 30, the scanner unit 10 sends the coincidence signal at the step S4, the flow is branched at step S6, and the scanner unit 10 sends the image data from the interface unit 15. Therefore, at the step S6, the image data outputted from the interface unit of the scanner unit 10 is inputted to the RAM 33 in the computer 30 through the interface unit 35 in the computer 30, and thereafter, is stored in the hard disk drive (HDD) 34. In addition, the hard disk drive in the computer 30 stores the image data outputted from the scanner unit 10, and the coincidence or mismatch signal that shows coincidence or mismatch with the specific image pattern respectively and corresponds to this image data.

Next, the operation in the case where the computer 30 sends a scanner operation instruction to the scanner unit-B 20 not having a forgery judging unit connected to the network 40, and takes in the image data of an origin set on an original table of the scanner unit-B to the computer 30 will be described. The scanner unit-B inputs the scanner operation instruction, sent from the interface unit 35 in the computer 30, from the interface unit 15. The original reading unit 11 in the scanner unit-B scans an original image set on a predetermined original table, and the scanner unit-B converts the original image into an image data signal through an optical system and a photoelectric conversion element. Furthermore, the scanner unit-B writes image data, which is converted, in the image memory 12, performs predetermined image processing in the image processing unit, and thereafter, outputs the original image data, which is read, from the interface unit 15.

The original image data outputted is not only taken in by the RAM 33 in the computer 30 through the interface unit 35 but also stored in the hard disk drive 34.

As described above, by the instruction from the computer 30, a scanner connected to a network scans an original image on an original table, and sends an original image signal, obtained by scanning the original image, to the computer 30. The computer 30 stores the original image signal, sent by the scanner that is made to scan the original image by the computer 30, in the hard disk drive (HDD) 34 in the computer. Furthermore, when the original image data is stored in the hard disk drive 34 in the computer, if the specific image pattern and the coincidence or mismatch signal are sent from the scanner, the computer 30 stores them in the hard disk drive 34 with making them correspond to the original image data.

Next, the operation at the time when a data signal stored in the hard disk drive 34 is printed by the computer 30 will be described. The computer 30 reads the data signal, which will be printed, from the hard disk drive 34, and sends the data signal to the interface unit 111 in the printer unit 100 through the interface unit 35 and network 40. Before sending the data signal to be printed, the computer 30 sends the result signal of the forgery judgment that corresponds to the image data that is printed and is stored in the hard disk drive, if the result signal is present. In addition, the operation of the printer unit 100 follows the flow shown in FIG. 4 described above.

The printer unit first inputs data from the interface unit 111 (step S11), and judges whether the mismatch signal is present (step S13). If the mismatch signal is present, the printer unit writes the image data, which are subsequently inputted, in the image memory 112 (step S12), and starts printing operation. If not, it is judged whether the coincidence signal is present (step S14). If being present, the printer unit stops the printing operation (step S17).

If the coincidence signal is also not detected at the step S14, the printer unit 100 writes the input image data in the image memory 112 (step S19). Furthermore, the forgery judging unit 113 compares and collates the image data with the specific image pattern (step S15). If coincidence with the specific image pattern is detected, the printer unit 100 stops the printing operation (step S17), and if not, the printer unit 100 starts the printing operation (step S18).

In addition, when the printing operation is stopped at the step S17, it is also good enough to send a comment signal, denoting that the image data is not suitable to printing operation, from the interface unit 111 to the interface unit 35 in the computer 30, and to display a warning message on a CRT in the computer 30.

As described above, if there is result data of forgery judgment corresponding to image data when the computer 30 prints the image data, by sending the result data of forgery judgment to a printer unit before sending the image data to be printed, it becomes possible that the printer unit immediately starts or stops printing operation without performing duplicated forgery judgment processing.

Furthermore, by performing forgery judgment processing in the printer unit if the result data of forgery judgment that corresponds to the image data is not sent, it becomes possible to limit the printing operation of the image data, which is not suitable to printing operation, such as securities and bank bills.

In addition, in the above-described embodiment, the printer unit is controlled so as to stop printing operation if it is detected from the result of judgment, performed by the forgery judging unit, that the image data coincides with the specific image pattern. Nevertheless, it is also good enough to fill in a print image output with a specific color (black, yellow, magenta, cyan, or the like) without stopping the printing operation.

In the above description, the forgery judging units in the scanner unit and printer unit judge whether the image data coincides with the specific image pattern and discriminate the image data from the image data of securities, bank bills, or the like. Nevertheless, judging means of the forgery judging units is not limited to this, but it is also good enough to control copying by detecting digital water mark information embedded in the image data, or a specific frequency component.

Furthermore, if the scanner unit scans an original on an original table according to a scanner operation instruction by a computer and judges by forgery judgment processing in the scanner unit that the original set on the original table is a security or a bank bill, it is also good enough to display an warning message, which means to bring in image data obtained by scanning the original whose copying is inhibited, on a CRT in the computer 30 by using a signal of coincidence with the specific image pattern inputted in the computer.

Moreover, although image data is obtained by a scanner in the above-described embodiment, it is apparent that it is also good enough to obtain image data from a digital camera, memory for a digital camera (compact flash memory, a smart card, and a memory stick), and an image server.

As described above, it is possible to prevent duplicated judgment of color image data that has been already judged on specific images. Furthermore, it is also possible to securely judge color image data having been not judged yet. In consequence, it becomes possible to efficiently perform the judgment on the specific image.

In addition, if a plurality of image processing apparatuses have a plurality of specific image judging units, any one of the plurality of specific image judging units judges color image data, and thereafter, the other plurality of specific image judging units do not judge the color image data. Therefore, it is possible to increase processing speed, and hence it is possible to increase performance.

Furthermore, the present invention is an image processing method of receiving color image data from an image generating apparatus, having a forgery judging function, and an image generating apparatus not having a forgery judging function, judging whether a color image is a specific image from the color image data received, and outputting the color image data for making an image forming unit form the color image by using the color image data received, the image processing method comprising the steps of:

controlling the formation of the color image according to a result of judgment by the image generating apparatus having the forgery judging function if the color image data is generated by the image generating apparatus having the forgery judging function; and controlling the formation of the color image according to a result of judgment of whether the color image obtained from the color image data received is the specific image if the color image data is generated by the image generating apparatus not having the forgery judging function. Therefore, it is possible to preferably efficiently process the color image data received from any one of the image generating apparatus, having the forgery judging function, and the image generating apparatus not having the forgery judging function.

Fourth Embodiment

Figure 6:
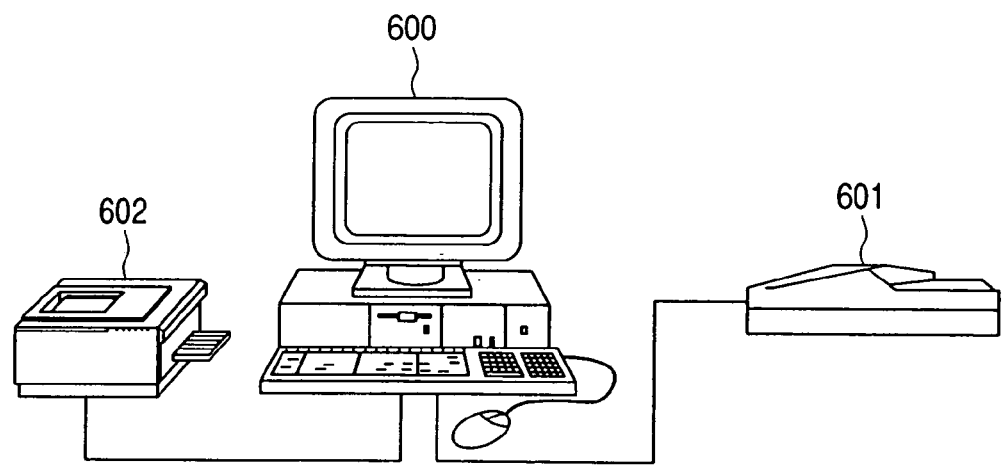
FIG. 6 is a schematic diagram showing an image processing system according to a fourth embodiment.

FIG. 6 shows the configuration of an image processing system according to a fourth embodiment. An image data controller 600 performs input/output control of image data and is implemented with a computer. A scanner 601 reads an original, and converts the original into an image signal. Furthermore, a printer 602 prints the image signal converted.

Next, each internal configuration will be described with reference to each block diagram.

Figure 7:
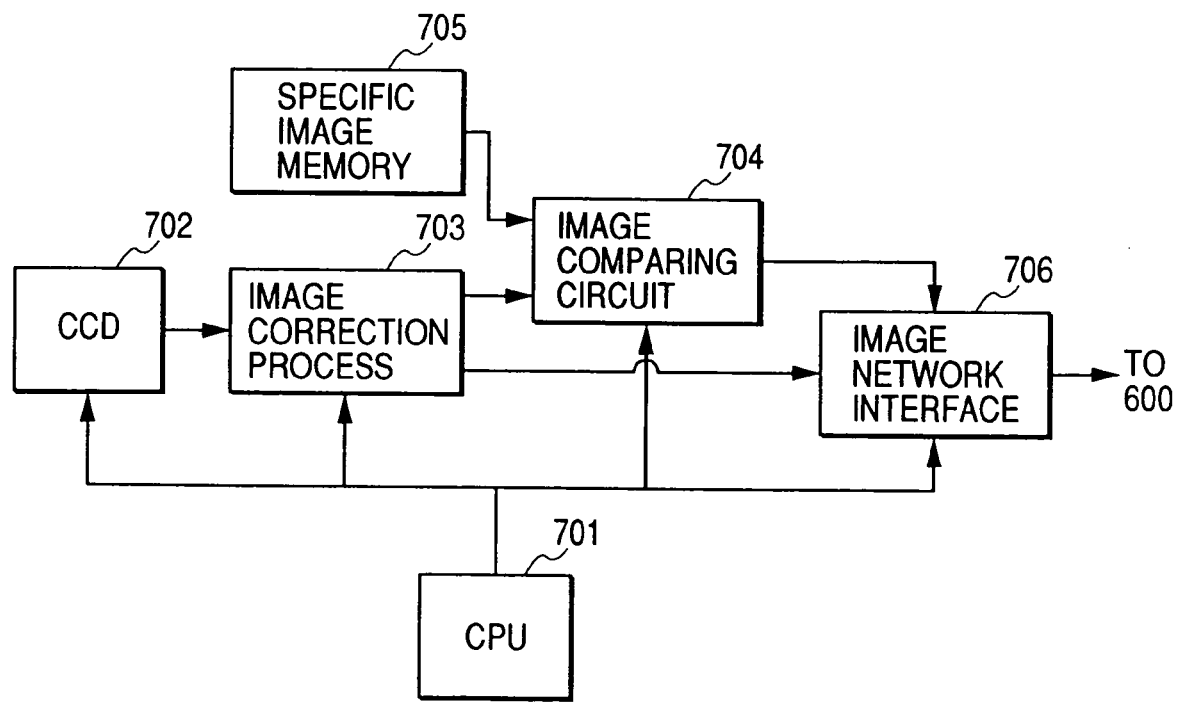
FIG. 7 is a block diagram showing internal-blocks of a scanner.

FIG. 7 is a block diagram of the scanner. A CPU 701 controls the entire scanner 601. This CPU 14 701 controls an image signal processor, and an optical system and a mechanism that are used for reading and are not shown. A CCD 702 converts the original into an electric signal. Image correction processing performed by an image correcting circuit 703 includes shading compensation for compensating the dispersion of light distribution among a central part and end parts, and color space transformation for transforming a CCD-specific color transforming characteristic into a standard color space. An image comparing circuit 704 judges a coincidence degree between image data and specific image data, which are read. Memory 705 stores the specific image data, which is described above, for image comparison. In addition, the specific image data can be any data so long as the data is data for identifying a specific image. For example, if a specific image has a specific pattern, the data is information of expressing the specific pattern, and if the specific image has a digital water mark, the data is information of expressing the digital water mark. This digital water mark is technology of adding information to a specific frequency in an image, and is a suitable method for adding information so as not to be seen by an outsider. An image network interface 706 transfers data to the image data controller 600.

Figure 8:
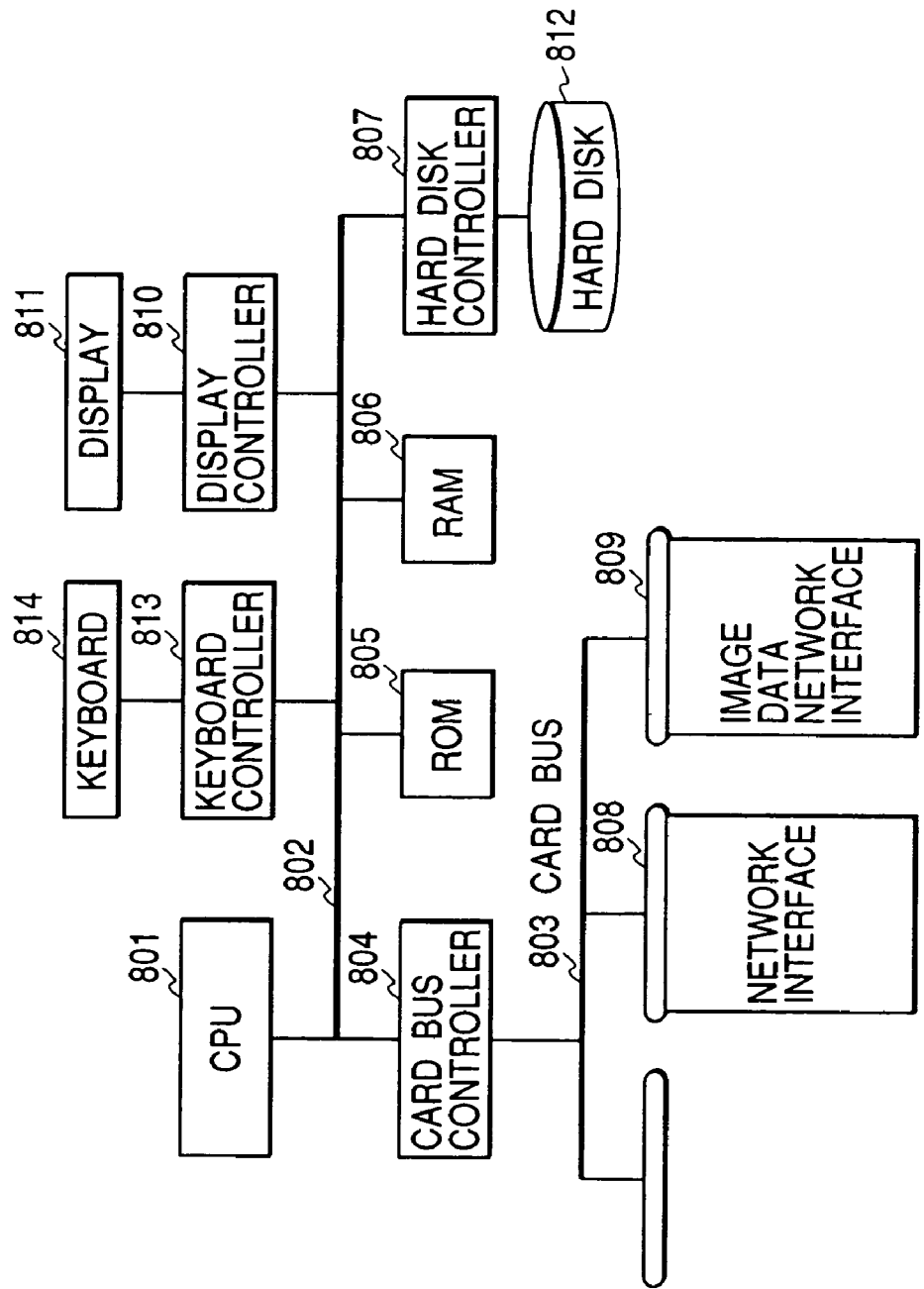
FIG. 8 is a block diagram showing internal blocks of an image data controller.

FIG. 8 is a block diagram of the image data controller 600. A CPU 801 in the image data controller 600 performs the input/output control of data with the scanner and printer. A data bus 802 is a data bus of the CPU, and a card bus controller 804, ROM 7 805, and a hard disk controller 807, which are described later, are connected to the data bus 802. The card bus controller 804 controls a card bus 803 for inserting a functional board for adding a function to the image data controller 600. The ROM 805 is program memory where control software for the image data controller 600 is stored. The RAM 806 is configured by DRAM or SRAM, is used as a work area for usual programs, and can be also used as image data memory. The hard disk controller 807 performs the read/write control of a hard disk drive 812. The hard disk drive 812 is used for storing image data and program software, and, the hard disk controller 807 compresses data when this is used for storing image data, and the controller 807 also expands the data when used for reading image data.

Next, each functional board connected to the card bus 803 will be described. A network interface card 808 is an interface for a network that is not shown. This is such configuration that a card corresponding to a physical interface constituting a network such as an Ethernet network and a token-ring network can be installed. An image data network interface card 809 is a network interface transferring image data with the scanner, printer, and the image data controller which are shown in FIG. 6. It is necessary to configure this image network with a high-speed bus, where a large volume of image data can be transferred, such as IEEE 1394 and USB. Next, a display 811 is connected to a display controller 810. A keyboard 814 is connected to a keyboard controller 813. In this image processing system, a user instructs the reading of an original or printing operation by using a device such as the keyboard 814 and a mouse, which is not shown, with watching the display 811.

Figure 9:
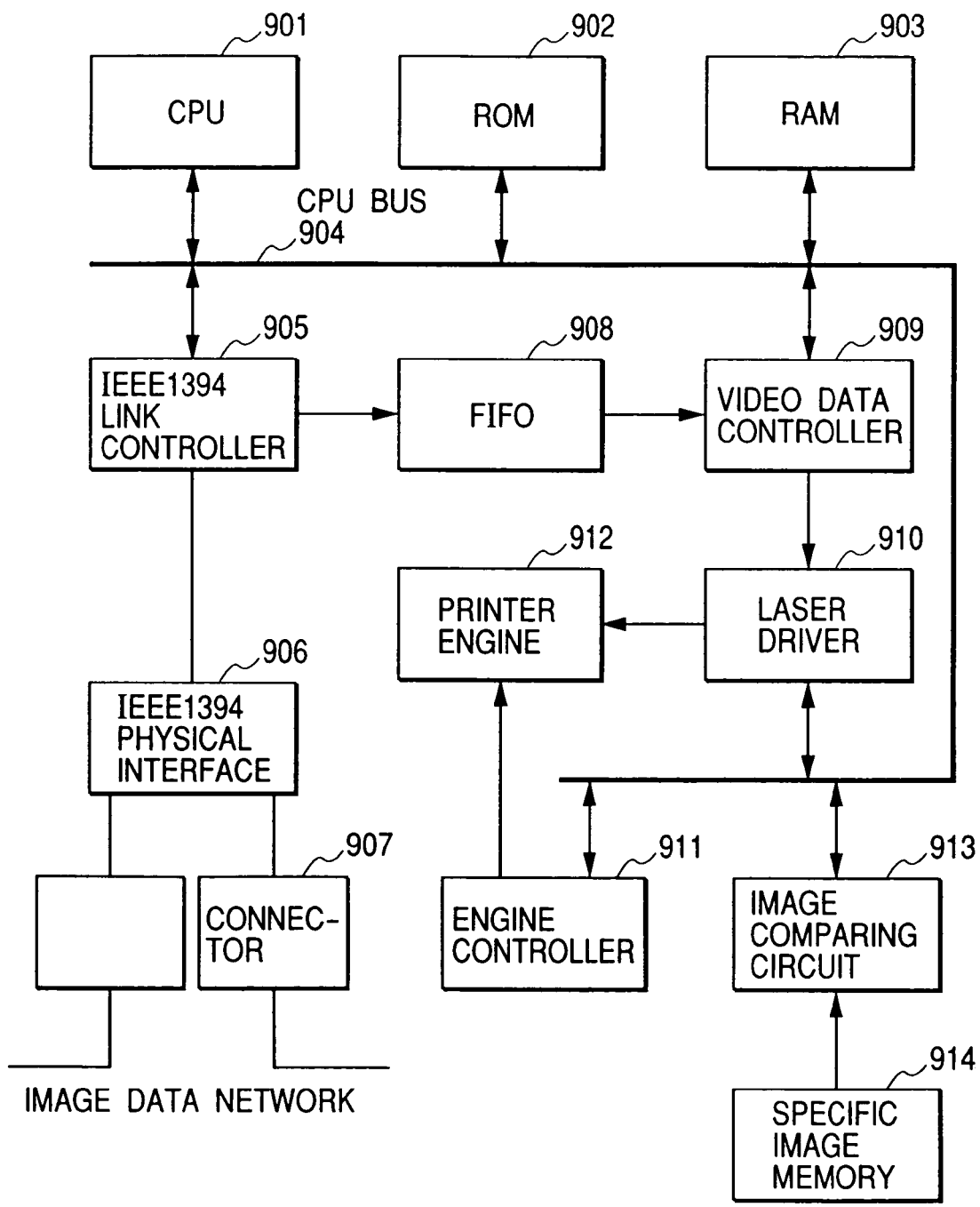
FIG. 9 is a block diagram showing internal blocks of the printer.

FIG. 9 is a block diagram of the printer. A CPU 901 controls the entire printer such as mechatronics control of the printer, and reception of bit map data. Memory 902 stores programs for the CPU 901, RAM 903 and a CPU address and data bus 904 are used by the CPU 901, and an IEEE 1394 link controller 905 interfaces with the image network 101. Furthermore, an IEEE 1394 connector 907 is connected to an IEEE 1394 physical interface 906, and first-in-first-out memory (hereinafter, FIFO) 908 temporarily stores bit map data transferred by isochronous transfer. Moreover, a video data controller 909 controls reading of bit map data from the FIFO 908 with synchronizing the reading with the operation timing of a printer engine 912. A laser driver 910 is used for printing operation, an engine controller 911 performs mechatronics control such as motor control of the printer engine 912, and paper supply control.

In addition, an image comparing circuit 913 judges a coincidence degree between the image data, inputted in the printer, and the specific image data. Memory 914 stores the specific image data for comparing images. In addition, it is apparent that the IEEE 1394 physical interface 906 is not limited to IEEE 1394, but other standard interfaces such as USB (Universal Serial Bus) interface can be used as the physical interface 906.

Figure 10:
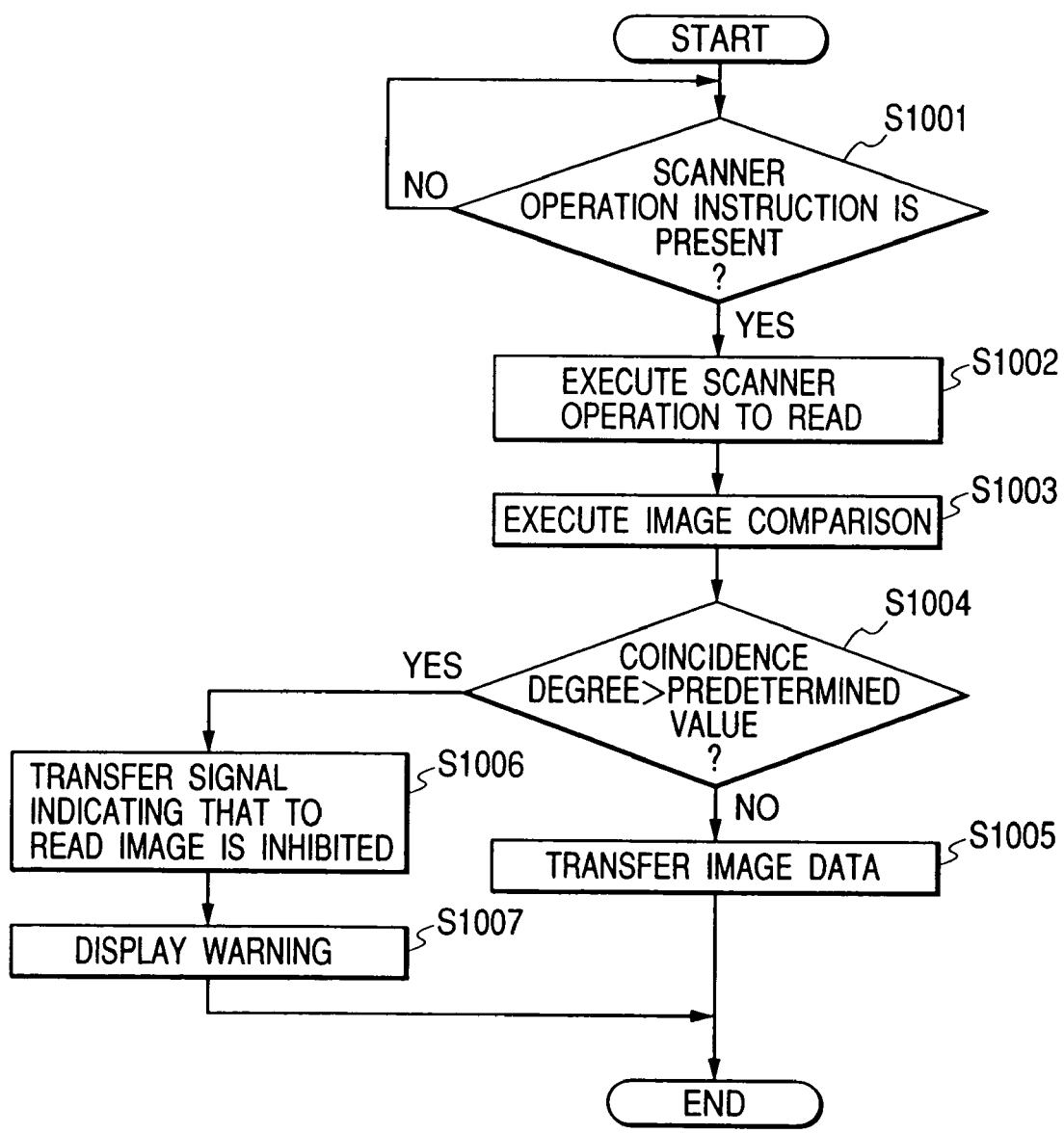
FIG. 10 is a flow chart showing the operation of a scanner.

Next, the operation of the scanner will be described with reference to a flow chart shown in FIG. 10.

An operator sets an original on the scanner 601, and instructs the reading of the original from the image data controller 600. If a read instruction is issued at step S1001, the flow goes to step S1002, and the scanner 601 reads the original. The image correcting circuit 703 performs the predetermined image processing of image data read by the CCD 702, and the flow goes to step S1003, where the image comparing circuit 704 compares the image data with the specific image. If it is judged at step S1004 that the coincidence degree is larger than a predetermined value, the flow goes to step S1006. Then, the scanner 601 sends a signal, denoting that the original under reading is a read-inhibited image, to the image data controller 600. The image data controller 600 receiving this signal displays a warning, shown in FIG. 11, on the display 811. On the other hand, if the coincidence degree does not exceed the predetermined value at the step S1004, the scanner 601 transfers the image data, which is read, to the image data controller 600 (step S1005).

The above is the operation of the image comparing circuit 704 in the scanner 601.

Next, the operation of the printer 602 will be described with reference to a flow chart shown in FIG. 12.

If an operator instructs printing operation to the image data controller 600 at step S1201, the flow goes to step S1202.

Image data is transferred from the image data controller 600 to the printer 602 through the image data network. Then, the printer 602 receiving the image data temporarily stores the image data in the RAM 903 through the image data network. Furthermore, image comparison with the specific image is performed at step S1203. If it is judged that the coincidence degree is larger than the predetermined value at step S1204, the flow goes to step S1206. The printer informs the image data controller of the fact that the image data that the printer 602 is instructed to print is a print-inhibited image. The image data controller receiving this information displays a warning, shown in FIG. 13, on the display 811. On the other hand, if the coincidence degree does not exceed the predetermined value at the step S1204, the printer performs printing operation (step S1205).

Figure 14:
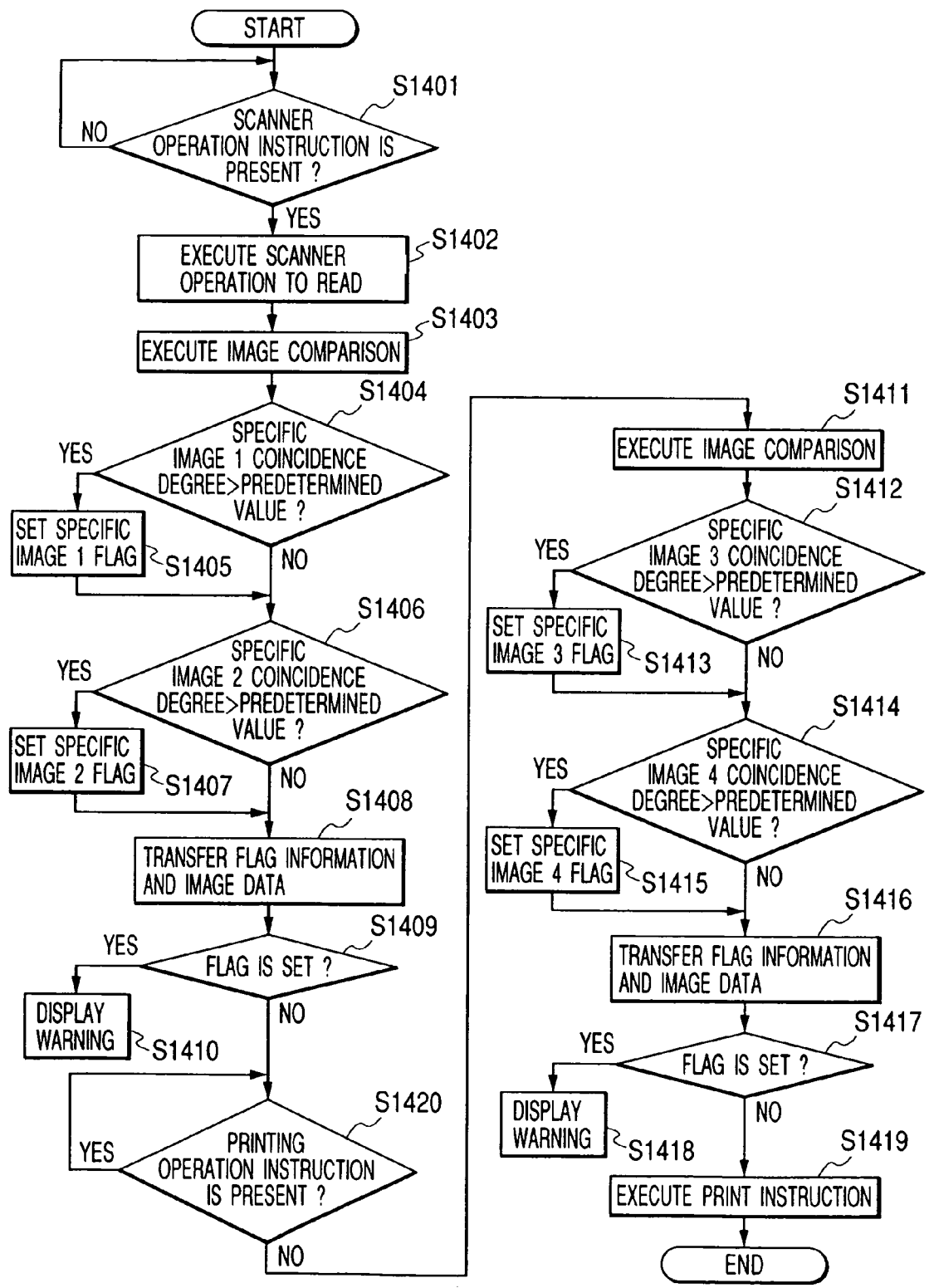
FIG. 14 is a flow chart showing dispersed-image-comparison operation in a scanner and a printer.

Next, a case that data in specific image memory for comparing images in the scanner is different from data in specific image memory of the printer will be described with reference to a flow chart shown in FIG. 14. It is assumed that specific image memory of the scanner and printer stores beforehand image data (pattern information or digital water mark information corresponding to the image data) shown in FIG. 15 respectively.

For example, the scanner stores an image of a Japanese Yen bank bill as a first specific image, and an image of a USA dollar bank bill as a second specific image, and the printer 602 stores an image of Germany bank bill as a third specific image, and an image of an English pound bank bill as a fourth specific image.

An operator sets an original on the scanner 601, and instructs the reading of the original from the image data controller 600. If a read instruction is issued at step S1401, the flow goes to step S1402, and the scanner 601 instructs the start of reading. The image correcting circuit 703 performs the predetermined image processing of image data read by the CCD 702, and the flow goes to step S1403, where the image comparing circuit 704 compares the image data with the first and second specific images. If it is judged at step S1404 that the coincidence degree with the first specific image is larger than a predetermined value, the flow goes to step S1405, where a first specific image coincidence flag is set and the flow goes to step S1406. If it is judged at the step S1404 that the coincidence degree with the first specific image is not larger than the predetermined value, the flow goes to step S1406 as it is. If it is judged at step S1406 that the coincidence degree with the second specific image is larger than a predetermined value, the flow goes to step S1407, where a second specific image coincidence flag is set and the flow goes to step S1408. If it is judged at the step S1406 that the coincidence degree with the second specific image is not larger than the predetermined value, the flow goes to step S1408 as it is. At the step S1408, the scanner 601 transfers the coincidence flag, which is a result of image comparison, and image data to the image data controller 600.

At step S1409, the image data controller 600 verifies the coincidence flag transferred, and if the flag is set, the flow goes to step S1410 and the image data controller 600 gives the operator a warning shown in FIG. 11. In this case, the image data transferred at the step S1408 is erased or broken lest the image data should be used.

Next, if the operator issues a print instruct at step S1420, the image data controller 600 transfers the image data, which does not coincide with the first and second specific images, to the printer. The image comparing circuit 704 performs image comparison with the third and fourth specific images at step S1411. If it is judged at step S1412 that the coincidence degree with the third specific image is larger than the predetermined value, the flow goes to step S1413, where a third specific image coincidence flag is set and the flow goes to step S1414. If it is judged at the step S1412 that the coincidence degree with the third specific image is not larger than the predetermined value, the flow goes to step S1414 as it is. If it is judged at the step S1414 that the coincidence degree with the fourth specific image is larger than a predetermined value, the flow goes to step S1415, where a fourth specific image coincidence flag is set and the flow goes to step S1416. If it is judged at the step S1414 that the coincidence degree with the fourth specific image is not larger than the predetermined value, the flow goes to step S1416 as it is. At the step S1416, the printer 602 transfers the coincidence flag, which is a result of image comparison, to the image data controller 600.

At step S1417, the image data controller verifies the coincidence flag transferred, and if the coincidence flag is set, the flow goes to step S1418, and the image data controller gives the operator an warning shown in FIG. 13.

If the coincidence flag is not set, the image data controller 600 issues an image data print instruction to the printer 602.

The above is the operation in the case that image comparison with different specific images in the scanner and printer is performed.

In the above-described embodiment, the different specific images are stored in a scanner and a printer beforehand respectively. Nevertheless, duplicated comparison is not performed by controlling image comparison lest the image comparison with the same specific image should be performed through providing a coincidence flag even if the same specific image is stored in the scanner and printer. Therefore, processing time is shortened.

Fifth Embodiment

Next, an embodiment that, in case of performing image comparison with the specific images, a scanner roughly performs simple comparison and a printer performs detailed comparison only when its result is doubtful in view of its coincidence degree will be described with reference to FIG. 16.

If the operator issues a scanner operation instruction at step S1601, the flow goes to step S1602. At the step S1602, the scanner reads an original. At step S1603, reading resolution is dropped, for example, from 400 dpi to 200 dpi. Then, the image comparing circuit 704 shown in FIGS. 7 performs image comparison in short processing time. If it is judged at step S1604 that the image data is doubtful, a flag is set. If not, the flow goes to step S1606 as it is. At the step S1606, the scanner transfers the image data and flag information to the image data controller. At step S1607, the image data controller 600 transfers the image data with instructing the printer to perform detailed image comparison at printing operation according to an operator's instruction when the flag is set (step S1608).

If the coincidence degree exceeds the predetermined value at step S1609, the warning shown in FIG. 7 is displayed (step S1610). On the other hand, if the flag is not set at the step S1607 or the coincidence degree after detailed comparison does not exceed the predetermined value at the step S1609, printing operation is performed at step S1611.

In the above description, it is unnecessary to execute forgery judgment processing in a printer except a case that the image data is somewhat doubtful by performing image comparison in a scanner and the printer through dividing the image comparison into two stages, that is, rough comparison and detailed comparison. Therefore, a print output can be obtained without stress.

Sixth Embodiment

Although specific image memory is configured by ROM in the fourth embodiment, it becomes possible to flexibly perform image comparison by making such a system that specific image data is down-loaded from the image data controller (computer) 100 by the specific image memory being configured by RAM.

For example, it is possible to correspond to a newly designated copy-inhibited original by adding its specific image data from the external to the image data controller 600. In addition, even if any one of the scanner and printer does not have an image comparing circuit, it is possible to check all the copy-inhibited originals by down-loading data, used for judgment of all the copy-inhibited originals, into an apparatus having the image comparing circuit. Furthermore, it is possible to optimally distribute load by making the volume of data, which is down-loaded, variable according to the performance (throughput and resolution) of the scanner and printer.

Seventh Embodiment

Although, in the fourth to sixth embodiments, specific image judgment is performed in the scanner 601 and printer 602, here, the following example will be described. Thus, the example is a case that it is judged in a scanner driver of the image data controller (computer) 600 whether image data read by scan is equivalent to a specific image, and if an operator issues a print instruction, the printer driver of the image data controller (computer) 600 for controlling the printer judges the image data.

Figures 15, 17:
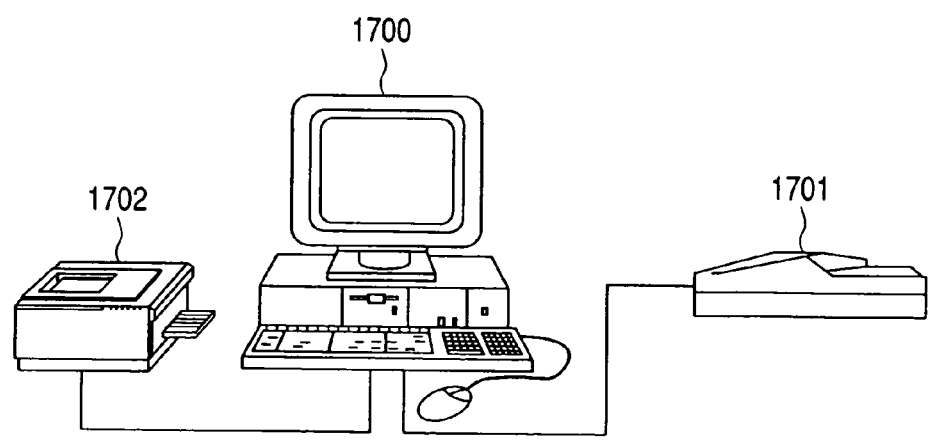
FIG. 15 shows an example of specific images.
FIG. 17 is a block diagram in a seventh embodiment.

FIG. 17 is a schematic diagram of this embodiment. In addition, FIG. 18 is a block diagram of the image data controller 1700.

A scanner 1701 and a printer 1702 that are shown in FIG. 17 are connected to the image data controller 1700. A scanner driver and a printer driver stored in a hard disk drive 1812 of the image data controller 1700 are activated on an OS in the image data controller 1700, and execute the following processing by calculation executed by a CPU 1801.

In the image data controller shown in FIG. 18, the scanner driver and printer driver, which are used at the time of image reading and image printing by the scanner 1701 and a printer 1702 respectively, are stored in the hard disk drive 1812. According to an operator's instruction through a keyboard 814 or a mouse not shown, the scanner driver and printer driver perform the reading of an image and the control of generating an image data file by the scanner, and the control of printing the image data file by the printer. In addition, the description of components having the same reference numerals as those in FIG. 8 will be omitted.

When a color image is scanned by the scanner 1701, an operator activates a scanner driver, which is software for controlling the scanner 1701, from the keyboard or mouse in the image data controller 1700.

The operator performs a scan instruction by operating this scanner driver. According to this instruction, a read control signal is outputted to the scanner 1701, and color image data corresponding to an image is outputted to the image data controller 1700.

The scanner driver judges whether the color image data received from the scanner 1702 is equivalent to a specific image (a bank bill, a security, or the like).

In this judgment, characteristic data of specific images that are stored in the hard disk drive 1812 beforehand for judgment in the scanner driver is called in the RAM 806. Furthermore, by the scanner driver comparing this characteristic data with color image data by using this data, judgment is performed.

If the scanner driver judges from a result of this judgment that the color image data is equivalent to a specific image, the scanner driver displays the warning shown in FIG. 11.

On the other hand, if the scanner driver judges that the color image data is not equivalent to the specific image, the scanner driver compresses the color image data into a JPEG image file or the like. Furthermore, the scanner driver makes the file stored in the hard disk drive 1812 of the image data controller. In addition, the scanner driver adds information of a kind (for example, a Japanese ten thousand yen note, a five thousand yen note, a one thousand yen note, and traveler's checks) of the specific image, which has been already judged, to the image file. This information showing the kind of the specific image is protected so that the information cannot be rewritten or the image file itself cannot be opened if the information is rewritten.

Next, the processing of specific image judgment by the printer driver will be described.

In addition, the printer driver also executes the following processing by the calculation executed by the CPU 1801 in the image data controller 1700.

An operator inputs a print instruction of an image, which is stored in a file and is desired to be printed, through the keyboard or mouse.

The printer driver is activated in the image data controller 1700 by this print instruction.

The printer driver refers to the information of the kind of the specific image that has been already judged, the information, which is added. Using judgment data for the printer driver that relates to kinds of specific images, which have not been judged yet, and is stored in the hard disk drive 1812, the printer driver checks whether the image to be printed is one of the specific images.

Thus, if there is the data of specific images for judgment that have not been judged yet, the printer driver judges whether the color image data coincides to one of the specific images, using this data. In addition, it is needless to say that, in this judgment also, the characteristic data (colors, patterns, digital water marks, combination of these characters, or the like) of specific images are used.

Furthermore, if it is judged that the color image data coincides to one of the specific images, the printer driver makes a display of the image data controller display the warning shown in. FIG. 13. On the other hand, if the judgment of all the specific images that the printer driver can judge has been already performed, judgment processing is skipped. Obviously, it is conceivable that a scanner does not have a specific image judging function. As for an image file obtained from such a scanner, it is obvious from the information added to the image file that no judgment has been performed. Therefore, the printer driver judges color image data on all the specific originals that the printer driver can judge.

In addition, if the printer driver recognizes from the information, added to the image file, that the scanner used for creating this image file does not have a specific image judging function, the printer driver displays a message, prompting the operator to install a new version of scanner driver having the specific image judging function via Internet, on the display of the image data controller 1700 after print processing.

If information showing a scanner manufacturer is added to the image file, it is possible to provide an operation environment, which the operator easily can use, for the operator by the following procedure. Thus, the procedure includes the steps of making the configuration of referring to address information every manufacturer, which the printer driver manages, from this information, retrieving an IP address of the manufacturer, and displaying this IP address with this message.

By adopting the above configuration, it becomes possible to perform specific image judgment by using the scanner driver and printer driver. In addition, this embodiment adopts such configuration that only specific images that the scanner driver has not judged are judged in the printer driver. Therefore, it is possible to avoid waste of judging the same specific image in both the scanner driver and printer driver. In consequence, it becomes possible to reduce total print (copy) time.

In addition, the information of a kind of a specific image, which has been already judged, the information which is added to an image file obtained by scan is protected so that the information cannot be rewritten or the image file itself cannot be opened if the information is rewritten. Therefore, it is possible to keep a high level of security.

Depending on a version of a scanner driver, it is conceivable that the scanner driver does not have a specific image judging function. As for an image file obtained from such a scanner, it is obvious from the information added to the image file that no judgment has been performed. Therefore, the printer driver can efficiently perform judgment.

In addition, if the printer driver recognizes from the information, added to the image file, that the scanner used for creating this image file does not have a specific image judging function, the printer driver displays a message, prompting the operator to install a new version of scanner driver having the specific image judging function, and an IP address. Therefore, since the operator can easily install the scanner driver having the specific image judging function, it becomes possible to distribute processing between the printer driver and scanner driver.

In consequence, it becomes possible to distribute the time necessary for specific image judgment between scan processing and print processing. Hence, it becomes rare to feel slow processing by sharing specific image processing among scanning and printing which are performed in separate timing although, in the case of performing judgment only in printing, usually, the operator feels as if print time considerably slowed.

Hereinabove, it becomes possible to perform specific image judgment processing with distributing the processing between the first and second apparatuses.

In addition, it becomes possible to efficiently perform the judgment of specific images different in the first and second apparatuses.

Furthermore, if it is judged that the original image is a specific image by using an image signal with low resolution, judgment of specific images is performed by using an image signal with high resolution. Therefore, it is possible to avoid waste of processing caused by judgment using an image signal with unnecessarily high resolution.

An image that is not equivalent to a specific image as a result of judgment of specific images can be stored in an image file. In addition, since it is possible to perform judgment processing in consideration of the information of the specific image having been judged, efficient judgment can be performed.

Moreover, since the information of the specific image having been judged is protected, a high level of security of this information can be realized.

In addition, it becomes possible to easily provide a specific image judging function for an apparatus creating an image file.

Furthermore, it is possible not only to provide a storage medium stored an image having been judged on specific images, but also to provide a storage medium where the information of what specific images are used for judgment. Moreover, since this information can be protected, a high level of security can be realized.

Eighth Embodiment

Hereinafter, an eighth embodiment will be described with reference to drawings.

<Configuration and Operation of Image Input/Output Processing Apparatus>

Next, the configuration and a series of operation of an image input/output processing apparatus 1900 will be described with reference to FIG. 19.

In the image input/output processing apparatus 1900, image data taken in from a scanner circuit 1901, image data received by a facsimile circuit 1903, or image data obtained by a PDL circuit 1904 is inputted.

The scanner circuit 1901 supplies image data read by scanning an original to an input/output control circuit 1907. In addition, the facsimile circuit 1903 can transfer image data, and supplies image data, which is received, to the input/output control circuit 1907. Furthermore, the PDL circuit 1904 develops PDL (Page Description Language) data, which is generated in a host computer (simply called a host) 1906 and transmitted via an interface circuit 1905, into a bit map image. Here, the interface circuit 1905 not only supplies the PDL data to the PDL circuit 1904 and transfers data with the input/output control circuit 1907, but also performs duplex communication of image data with the host 1906.

In addition, the input/output control circuit 1907 stores image data, supplied from the scanner circuit 1901, facsimile circuit 1903, or PDL circuit 1904, in a buffer memory circuit 1908 by controlling write and read operation of image data with the buffer memory circuit 1908, and write and read operation of image data with a storage device 1910 through a compressing/expanding circuit 1909. Furthermore, the input/output control circuit 1907 stores the image data in the storage device 1910, configured by an MO (Magneto-Optical disk) drive, a hard disk drive, or the like, through the compressing/expanding circuit 1909. Moreover, the input/output control circuit 1907 supplies the image data, which is supplied, to a judging circuit 1911.

The judging circuit 1911 judges whether image data from the input/output control circuit 1907 is equivalent to a specific image, and supplies a result of the judgment to a system control circuit 1912.

The system control circuit 1912 is configured by a CPU or the like, and performs the operation control of the entire image input/output processing apparatus 1900 according to various settings, which relate to the image input/output processing apparatus 100 and are performed by an MMI (Man-Machine Interface) circuit 1914 such as an operation unit or the like, and a processing program stored beforehand in ROM 1913. In particular, the system control circuit 1912 controls the operation of the input/output control circuit 1907 according to the result of the judgment by the judging circuit 1911.

The input/output control circuit 1907 supplies image data, which is stored in the storage device 1910 as described above, to a printer device 1902, printing the image data, through the compressing/expanding circuit 1909 under the control of the system control circuit 1912.

The printer device 1902 prints the image data from the input/output control circuit 1907.

(Configuration of System Control Circuit 1912)

Next, the system control circuit 1912 described above will be concretely described.

For example, a control program following a flow chart shown in FIG. 20A is stored in the ROM 1913 beforehand. Furthermore, this control program is read and executed by the system control circuit 1912. Owing to this, the image input/output processing apparatus 1900 operates as follows. In addition, the control program shown in FIG. 20A is to realize a copy function, and this copy function is part of functions of the image input/output processing apparatus 1900.

When the control program that has the procedure shown in FIG. 20A and is stored in the ROM 1913 is read and executed by the system control circuit 1912, the system control circuit 1912 issues an image read instruction to, for example, the scanner circuit 1901 through the input/output control circuit 1907. Owing to this, the scanner circuit 1901 reads an image on the original, which is not shown, as image data in a digital system (hereinafter, image data) (step S2001).

The image data read at the step S2001 by the scanner circuit 1901 is stored in the buffer memory circuit 1908 under the control of the input/output control circuit 1907 (step S2002).

In addition, the image data read is also supplied to the judging circuit 1911 under the control of the input/output control circuit 1907. The judging circuit 1911 judges from the presence of a digital water mark or the collation of characteristics whether the image data given is equivalent to a specific image (step S2003).

If judging the image data from the presence of the digital water mark, the judging circuit 1911 judges whether the information of a specific digital water mark inserted beforehand is present in the image data supplied from the input/output control circuit 1907. If there is the information of the specific digital water mark in the image data given, the judging circuit 1911 judges that the image data is equivalent to the specific image.

If judging the image data from the collation of characteristics, the judging circuit 1911 extracts the characteristics of the image data supplied. Then, the judging circuit 1911 compares the characteristic data with characteristic data of specific images, which are held beforehand and are specific images such as securities and bank bills that must not be originally copied, and judges a similarity degree. If the similarity degree between the image data and a specific image is equal to or more than a predetermined value, the judging circuit 1911 judges that the image data is equivalent to the specific image.

This judgment processing will be described later in detail. The result of judgment by the judging circuit 1911 is supplied to the system control circuit 1912.

If the image data is not equivalent to a specific image from the result of judgment by the judging circuit 1911, the system control circuit 1912 instructs the input/output control circuit 1907 to store the image data, stored at the step S2003 in the buffer memory circuit 1908, in the storage device 1910. Owing to this, the input/output control circuit 1907 reads the image data from the buffer memory circuit 1908, and supplies the image data to the compressing/expanding circuit 1909. The compressing/expanding circuit 1909 compresses the image data, supplied from the input/output control circuit 1907, with a predetermined compression method (step S2004), and stored the image data in the storage device 1910 (step S2005). In addition, if the judging circuit 1911 judges that the image data is equivalent to a specific image, the system control circuit 1912 instructs the input/output control circuit 1907 not to perform each processing at the above-described steps S2004 and S2005. Owing to this, if it is judged that the image data is equivalent to a specific image, the image data stored in the buffer memory circuit 1908 is not stored in the storage device 1910. Furthermore, if the image data is equivalent to a specific image, the system control circuit 1912 stores the information, showing that the image data is equivalent to the specific image and is not stored in the storage device 1910, as additional information in the storage device 1910 (step S2006). It is also good enough to store the information, showing that it is judged that the image data is not equivalent to the specific image, as additional information in the storage device 1910 if it is judged at the step S2006 that the image data is not equivalent to the specific image. By using this additional information, it is possible to easily recognize whether, for example, an input image is limited. Moreover, if the image data is not equivalent to the specific image, it is possible to judge from the additional information whether an image have been judged in regard to whether the image includes the specific image, or whether the image has not been judged, even if plenty of images are stored as image data in the storage device 1910 by storing as the additional information a fact that the image data is not equivalent to the specific image. In addition, it is good enough to make information, showing a control method of the image data judged to be equivalent to the specific image, included in the additional information. In this case, the image data is processed according to the control method.

After the above-described judgment processing at the step S2003 is performed and processing according to a result of the judgment are performed, the system control circuit 1912 recognizes through the input/output control circuit 1907 whether a next image is read and inputted by the scanner circuit 1901 (step S2007). For example, in case an automatic document feeder (not shown) is connected to the scanner circuit 1901, transfers a plurality of originals, and reads images on the plurality of originals, the system control circuit 1912 recognizes with an output of a document-setting sensor or the like of the automatic document feeder whether a next original is present. If the next original is present, the system control circuit 1912 performs such operation control that the above-described processing at and after the step S2001 is repeated. At this time, although a plurality of image data is stored in the storage device 1910, the address management of each image data is performed by the system control circuit 1912.

Next, the system control circuit 1912 recognizes, for example, a number of sets that is set through the MMI circuit 1914, and discriminates whether the printer device 1902 completes the printing of copies corresponding to the number of sets that is set (step S2008).

Then, if the printer device 1902 does not complete the printing of copies corresponding to the number of sets that is set as a result of the discrimination at the step S2008, the system control circuit 1912 reads the additional information of image data that will be read from now on, and judges the contents of the additional information (step S2014). If the system control circuit 1912 cannot read the additional information corresponding to image data, the system control circuit 1912 judges that it has not been judged yet whether the image data corresponding to the additional information includes a specific image. In addition, if the contents shows that the image data includes the specific image even if the system control circuit 1912 can read the additional information, the system control circuit 1912 judges that the image data includes the specific image. In these cases, the output operation of the image data is skipped. Only if the additional information can be read and its contents is that the image data does not include the specific image, the flow goes to step S2009, and the image data is printed.

In addition, in this embodiment, if it is judged that image data includes a specific image, the image data is thrown away after a single reading. Therefore, so long as a judging circuit correctly operates, the specific image is never copied even if the additional information is not referred to. Nevertheless, if copying is performed in such a state that the judging circuit is stopped, there is a possibility of copying being executed without judgment of whether the image data includes the specific image. In such a case, by referring to the additional information, it is possible to prevent copying of an original in such a state that a forgery-preventing function is stopped.

Then, at the step S2009, the system control circuit 1912 instructs the input/output control circuit 1907 to read image data stored in the storage device 1910. Owing to this, the input/output control circuit 1907 reads one image data out of the image data, stored in the storage device 1910, according to the order of storage by controlling read operation of the storage device 1910, and supplies the image data to the compressing/expanding circuit 1909 (step S2009). The compressing/expanding circuit 1909 expands the image data, read from the storage device 1910, with a predetermined expanding method (step S2010).

Next, the input/output control circuit 1907 stores the image data, expanded by the compressing/expanding circuit 1909 at the step S2010, in the buffer memory circuit 1908 (step S2011).

Furthermore, the input/output control circuit 1907 reads the image data, stored in the buffer memory circuit 1908 at the step S2011, and supplies the image data to the printer device 1902. Owing to this, the printer device 1902 prints out the image data supplied from the input/output control circuit 1907 (step S2012).

Next, the system control circuit 1912 discriminates through the input/output control circuit 1907 whether all the image data stored in the storage device 1910 have been read and printed to the last (step S2013).

Then, if all the image data have not been printed yet in consequence of the discrimination at the step S2013, the system control circuit 1912 performs such operation control that the processing at and after the step S2009 is repeated.

Owing to this, all the image data stored in the storage device 1910 are read in the order of storage and are printed out by the printer device 1902.

As described above, when the printing of all the image data stored in the storage device 1910 is completed, the system control circuit 1912 recognizes the completion of the printing in consequence of the discrimination at the step S2013. Then, the system control circuit 1912 returns to the discrimination processing at the step S2008 and discriminates again whether printing is completed to the last. In addition, if the printing is completed to the last in consequence of the discrimination at the step S2008, the system control circuit 1912 finishes this processing. If not completed yet, the system control circuit 1912 performs such operation control that the processing at and after the step S2009 is repeated.

Therefore, if one set of copies is printed out, image data is read from the storage device 1910 in the order of storage and sequentially printed out by the printer device 1902 by the processing at the steps 2009 to S2012 being repeated at a frequency corresponding to the number of image data stored in the storage device 1910.

In addition, if plural sets of copies are printed, image data is read from the storage device 1910 in the order of storage and sequentially printed out by the printer device 1902 by the processing in the above-described case of one set of copies being repeated at a frequency corresponding to the number of sets to be set.

When printing is performed, additional information stored in the storage device 1910 is referred to beforehand. Therefore, only if it is judged that image data is not equivalent to a specific image in consequence of judging whether the image data is not equivalent to a specific image, the image data is printed out. Since the image data judged equivalent to the specific image is not stored in the storage device 1910, the image data is not printed out by the printer device 1902.

Next, the above-described judgment processing (step S2003) performed by the judging circuit 1911 will be concretely described.

First, an example of using a digital water mark as a specific image used in this embodiment will be described. For example, image data read by the scanner circuit 1901 (hereinafter, this is also called an input image) is inputted.

The above-described input image that is inputted is divided into blocks, and Fourier transformation is performed every block and frequency components are extracted.

An input image in a frequency range that is obtained as this result is divided into amplitude spectrum and phase spectrum, and a registration signal included in this amplitude spectrum is detected.

A low frequency component signal embedded in an image has such a disadvantage that the low frequency component signal is easily recognized as noise due to human's visual performance in comparison to the embedding of a high frequency component signal. In addition, a high frequency component embedded in an image has a disadvantage of being removed by compressing/expanding operation because an irreversible compression method such as JPEG compression has an effect like a low pass filter. In view of these disadvantages, the registration signal is embedded in a impulse signal at a middle frequency that is equal to or higher than a first frequency that human can hardly sense and is equal to or lower than a second frequency that cannot be removed by the irreversible compressing/expanding operation.

Registration detection extracts the above-described impulse signal in a middle frequency range that is included in the amplitude spectrum.

A scaling factor of the input image is calculated from the coordinates of the impulse signal extracted. The judging circuit 1911 detecting the digital water mark recognizes beforehand what frequency component of the image that is an object of judgment and has not been scaled includes the impulse signal.

It is possible to calculate the scaling factor by comparing the frequency, recognized beforehand, with the frequency where the impulse signal is detected. For example, let the frequency, recognized beforehand, be a, and let the frequency of the impulse signal be b, and it can be seen that the scaling of a/b is performed. This is a well-known property of the Fourier transformation.

It is possible to detect the digital water mark, included in a digital image data, by determining the size of a pattern for detecting the digital water mark included in the input image from this scaling factor and performing convolution with using this pattern.

In addition, although a digital water mark can be added to any one of components constituting an input image, in this embodiment, the digital water mark is added to a blue component where human's visual sense is the most insensitive. In this case, the above-described pattern detection is performed for the blue component.

Furthermore, if a digital water mark is not added to a visible color component constituting an input image but such a digital water mark that information is embedded in a specific frequency component is embedded in the input image, it is also good enough to detect the digital water mark from the specific frequency after the Fourier transformation of the input image.

Moreover, judgment processing (step S2003) different from the above-described judging circuit 1911 will be described. For example, if image data read by the scanner circuit 1901 is color image data, the judging circuit 1911 transforms the input image and a specific image respectively into a common color space, and compares the input image with the specific image every pixel in the common color space.

Figure 21:
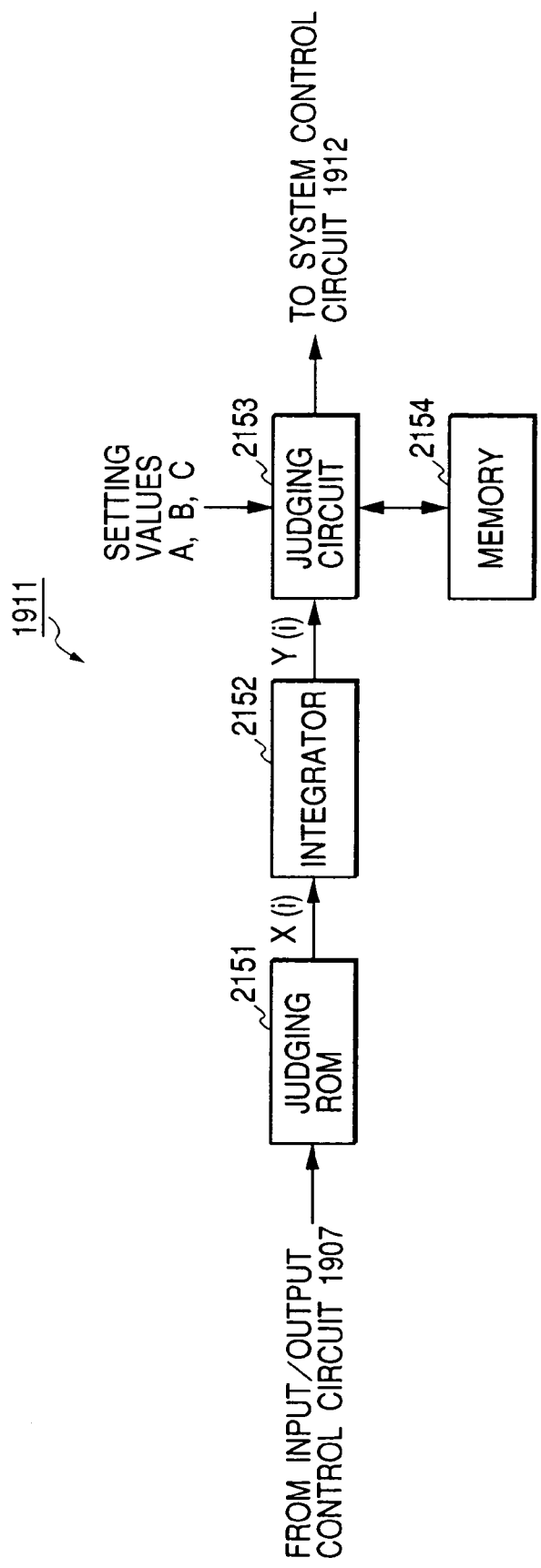
FIG. 21 is a block diagram showing the configuration of a judging circuit in the image input/output processing apparatus.

Then, as shown in FIG. 21, the judging circuit 1911, for example, includes judging ROM 2151 where the image data from the input/output control circuit 1907 (FIG. 19 described above) is supplied, an integrator 2152 where an output of the judging ROM 2151 is supplied, a judging circuit 2153 where an output of the integrator 2152 is supplied, and memory 2154 accessed by the judging circuit 2153. An output of the judging circuit 2153 is supplied to the system control circuit 2112 (FIG. 19 described above).

In the above-described judging circuit 1911, the judging ROM 2151 supplies data, read as an address input from image data outputted from the input/output control circuit 1907, to the integrator 2152. At this time, a value "1" is assigned to the judging ROM 2151 if color space data of the input image is included in the color space data of the specific image, and if not, a value "0" is assigned respectively. These values are made to be an input X(i) to the integrator 2152.

The integrator 2152 calculates the following formula with using the input X(i) from the judging ROM 2151, and supplies an integrated value Y(i) to the judging circuit 2153:

$$Y(i)=AY(i-1)+255(1-A)X(i)$$

i=1, 2, 3, . . . , and 0<A<1

The judging circuit 2153 obtains a number of pixels whose integrated values Y(i), which are outputs of the integrator 2152, are equal to or larger than a predetermined value (a set value A). Owing to this, the number of pixels in an area of the input image that is supposed to be an area of the specific image is calculated.

Here, a reason why the integrated value Y(i) is used is the filtering of pixels, sporadically included, by integrating the input X(i) since a series of pixels are included to some extent in case the input image is included in the color space data of the specific image.

If the number of pixels calculated as described above is equal to or larger than a predetermined value (a set value B), the judging circuit 2153 recognizes that the input image is an image including the color space of the specific image to some extent and there is a high probability of being the specific image. Furthermore, the judging circuit 2153 performs judgment processing of a similarity degree.

Thus, in this case, the judging circuit 2153 makes, for example, an arbitrary color in the color space correspond to an address in the memory 2154. Furthermore, the judging circuit 2153 stores "1" at an address, corresponding to a color of a pixel whose integrated value Y(i) that is an output of the integrator 2152 is equal to or larger than the set value A, in the memory 2154. Moreover, the judging circuit 2153 performs this for all the pixels of the input image.

In addition, the judging circuit 2153 counts a number of pixels stored as "1" in the memory 2154. If the number of pixels is equal to or larger than a predetermined value (a set value C), the judging circuit 2153 judges that the input image is similar to the specific image, and supplies a result of the judgment to the system control circuit 1912.

In this manner, it is possible to avoid duplication arising in the case where a count of the integrated value Y(i) that is an output of the integrator 2152 includes a value by plural counting of the same color by the judging circuit 2153 judging the similarity degree. Furthermore, it is possible to judge whether the input image includes the color space of the specific image over a wide range.

In addition, the judgment processing in the judging circuit 1911 is made to judge whether an input image is a specific image with the configuration shown in FIG. 21, but the judgment processing is not limited to this. Thus, the judgment can be also performed according to other algorithm. In short, in this embodiment, the judgment is sufficient so long as it is judged at least whether the input image is the specific image.

As described above, in the eighth embodiment, additional information relating to the judgment of whether image data that is inputted from input means is equivalent to a specific image is stored with the image data in memory means. For example, if plural sets of a plurality of originals are copied, it is possible to repeat copying after referring to the additional information. Therefore, it is possible to reduce the load of the judgment processing for forgery prevention. Furthermore, since the judging circuit 1911 is configured lest the input image should be stored in the storage device 1910 if it is judged that the input image is the specific image, it is possible to securely prevent forgery.

Figure 20B:
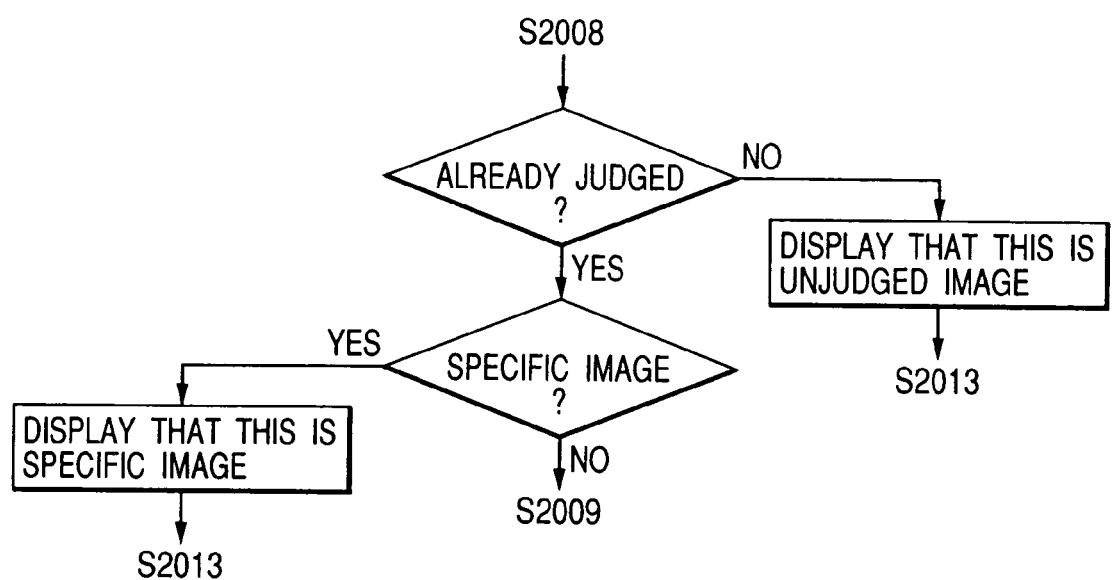
FIG. 20B is a flow chart of a processing program executed in a CPU of the image input/output processing apparatus according to a modified example of the eighth embodiment.

Modified Example of Eighth Embodiment (1) In addition, in the eighth embodiment, if it has been already judged whether an input image includes a specific image and the input image does not include the specific image as a result of the judgment at the step S2014, the flow goes to the step S2009. If not, the flow goes to the step S2013 as it is, and a next image is processed. Nevertheless, as shown in FIG. 20B, it is also possible to display an warning to a user. FIG. 20B shows steps with which the step S2014 in FIG. 20A can be replaced. After the step S2008 in FIG. 20A, it is judged whether it has been already judged whether an input image includes a specific image (step S2021). If not, it is displayed at step S2022 on a display panel or the like, which the MMI circuit 1914 has, that the image is not copied because the image has not been judged yet.

Even if the judgment has been already performed, if it is judged at step S2023 that the input image includes the specific image, it is displayed at step S2024 that the input image is not copied because the input image is the specific image.

With performing such processing, it is possible to give an warning for forgery prevention to an user. In addition, the procedure in FIG. 20B can be also applied to the following flow charts in FIGS. 22 to 24.

Figure 25A:
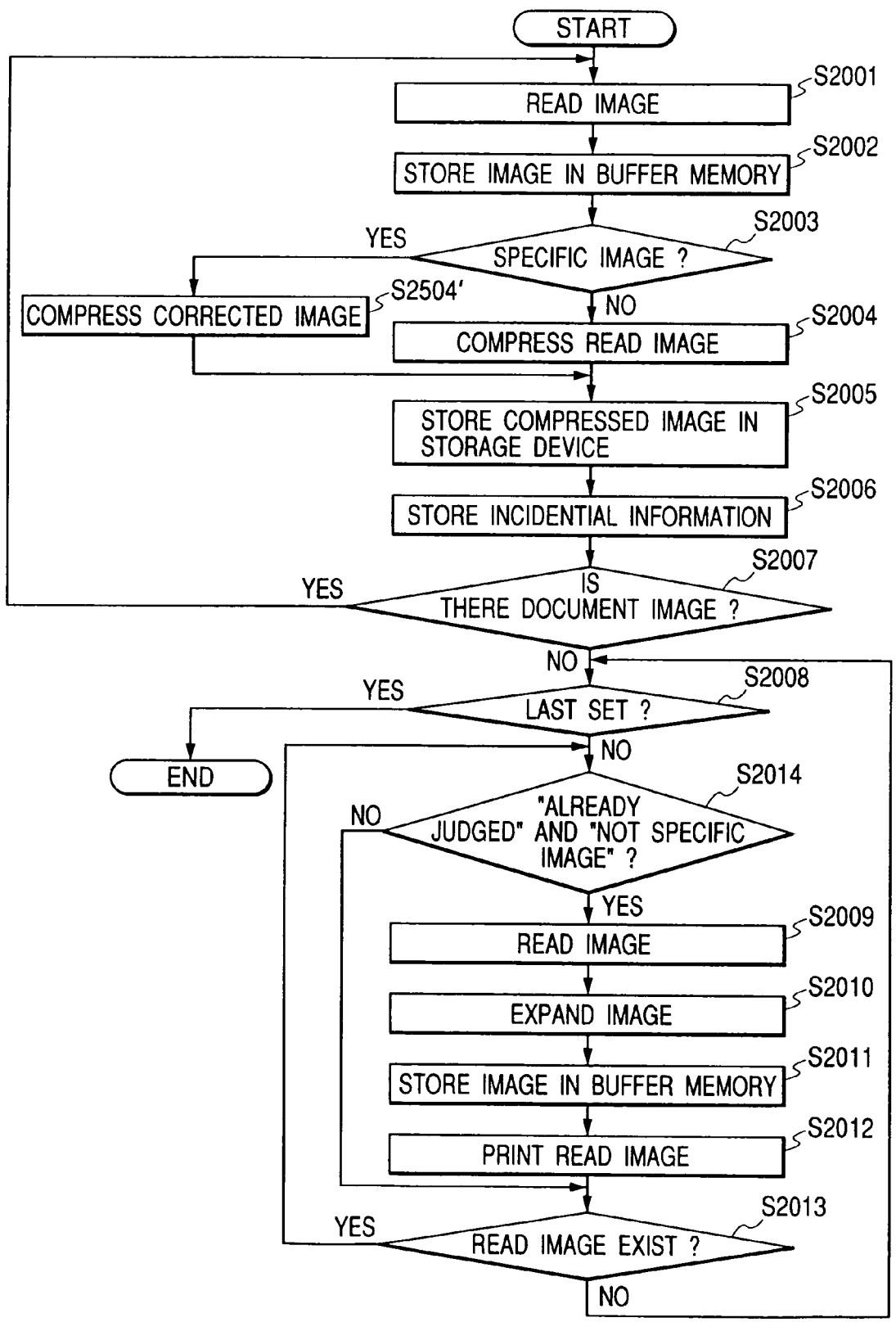
FIG. 25A is a flow chart of a processing program executed in a CPU in an image input/output processing apparatus according to a modified example of the eighth embodiment.

(2) In addition, in the eighth embodiment, if input image data includes a specific image as a result of the judgment at the step S2003 in the control program in FIG. 20, the input image data is not stored in the storage device 1910. Nevertheless, for example, as shown in FIG. 25A, in regard to the image judged as the specific image, it is also good enough to store a corrected image in the storage device 1910 after the processing of producing the corrected image from the image data (step S2504').

Thus, if it is judged with the judgment processing at the step S2003 that the input image data is equivalent to the specific image, the system control circuit 1912 instructs the input/output control circuit 1907 to add a specific pattern, held beforehand, to the image data stored in the buffer memory circuit 1908, and store the image data with the specific pattern in the storage device 1910. Owing to this, the input/output control circuit 1907 reads the image data from the buffer memory circuit 1908, and adds the specific pattern to the image data to supply the image data with the specific pattern to the compressing/expanding circuit 1909. The compressing/expanding circuit 1909 compresses the image data (corrected image) with the specific pattern from the input/output control circuit 1907 with a predetermined compression method (step S2504') to store the image data with the specific pattern in the storage device 1910 (step S2005). Therefore, in this case, in regard to image data judged equivalent to the specific image among image data printed by the printer device 1910, the images with the specific pattern are printed.

In addition, as described above, if image data includes a specific image, its corrected image is stored in the storage device 1910. Nevertheless, it is also good enough to store the following information as additional information in the storage device 1910 (step S2006). Thus, the information denotes that it is judged that the image data includes the specific image as a result of the judgment processing of whether the image data includes the specific image, and its corrected image is stored in the storage device 1910. Furthermore, also if the image data does not include the specific image, it is also good enough to store the following information as additional information in the storage device 1910 (step S2006). Thus, the information denotes that it is judged that the image data does not include the specific image as a result of the judgment processing of whether the image data includes the specific image.

By using this additional information, it is possible to easily recognize, for example, whether the input image is intentionally limited.

Figure 25B:
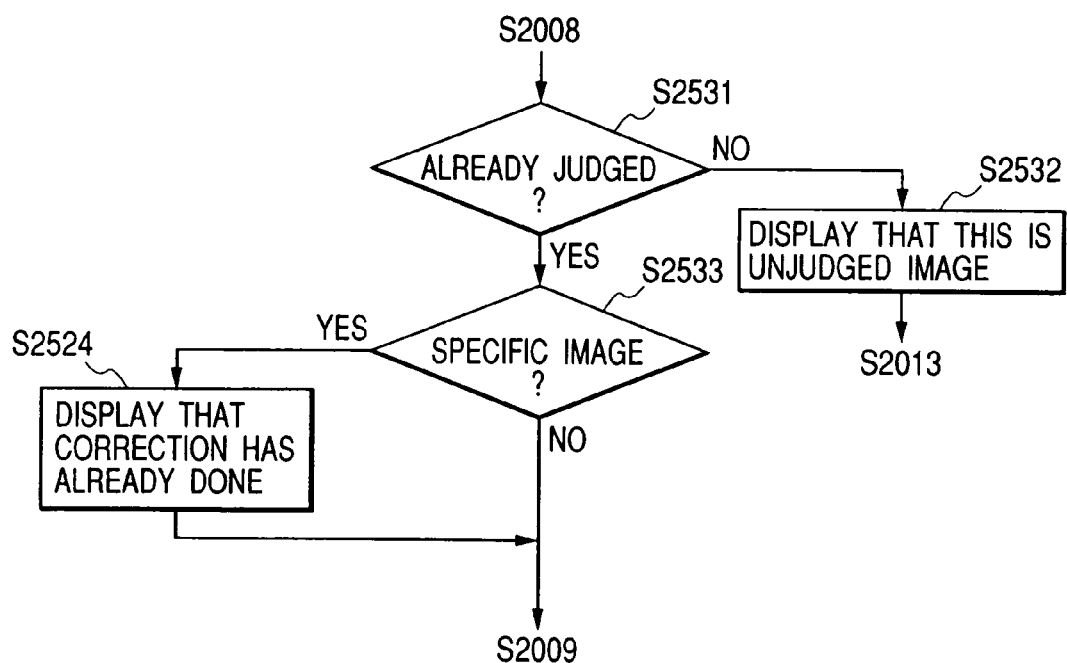
FIG. 25B is a flow chart of a processing program executed in a CPU in an image input/output processing apparatus according to a modified example of the eighth embodiment.

(3) Furthermore, in FIG. 25A, if it has been already judged whether input image data includes a specific image and the input image data does not include the specific image as a result of the judgment at the step S2014, the flow goes to the step S2009. If not, the flow goes to the step S2013 as it is to perform the processing of a next image. Nevertheless, as shown in FIG. 25B, it is also possible to give an warning to an user. The procedure in FIG. 25B can be also substituted for the step S2014 in FIG. 25A. After the step S2008 in FIG. 25A, it is judged whether it has been already judged whether input image data includes a specific image (step S2531). If not, it is displayed at step S2532 on a display panel or the like, which the MMI circuit 1914 has, that the image is not copied because the image has not been judged yet.

Even if it has been already judged whether the input image data includes the specific image, if it is judged at step S2533 that the input image data includes the specific image, that is, that a corrected image is printed, it is displayed at step S2524 that the input image is corrected because the input image is the specific image.

With performing such processing, it is possible not only to give an warning for forgery prevention to an user, but also to inform the user of a fact that the image outputted is not a copy of the original. In addition, the procedure in FIG. 25B can be also applied to the following flow charts in FIGS. 22, 24, and 26.

(4) In addition, although input images stored in the storage device 1910 is read in the order of storage in this embodiment, this processing is not limited to this, but it is also good enough to read the input images in the order different from the order of storage. Owing to this, it is also possible to correspond to a case that it is necessary to perform printing of front and back sides of paper with changing the order of printing, for example, like a case that pamphlets are created by saddle-stitching sheets of paper printed out from the printer device 1902.

(5) Furthermore, it is also good enough to create additional information for all the input images and to add to all the images the information of whether the judgment of specific images has been already performed. In this case, it is possible to judge with the information included in the additional information instead of the presence of the additional information whether the judgment has been already performed.

Ninth Embodiment

Next, a ninth embodiment will be described.

In the above-described eighth embodiment, if an input image is a specific image, the input image is not stored in the storage device 1910, or the input image is stored after correction processing. Here, all the input images are once stored in the storage device 1910, and the images, which are judged as the specific image, among stored images are deleted from the storage device 1910.

Figure 22:
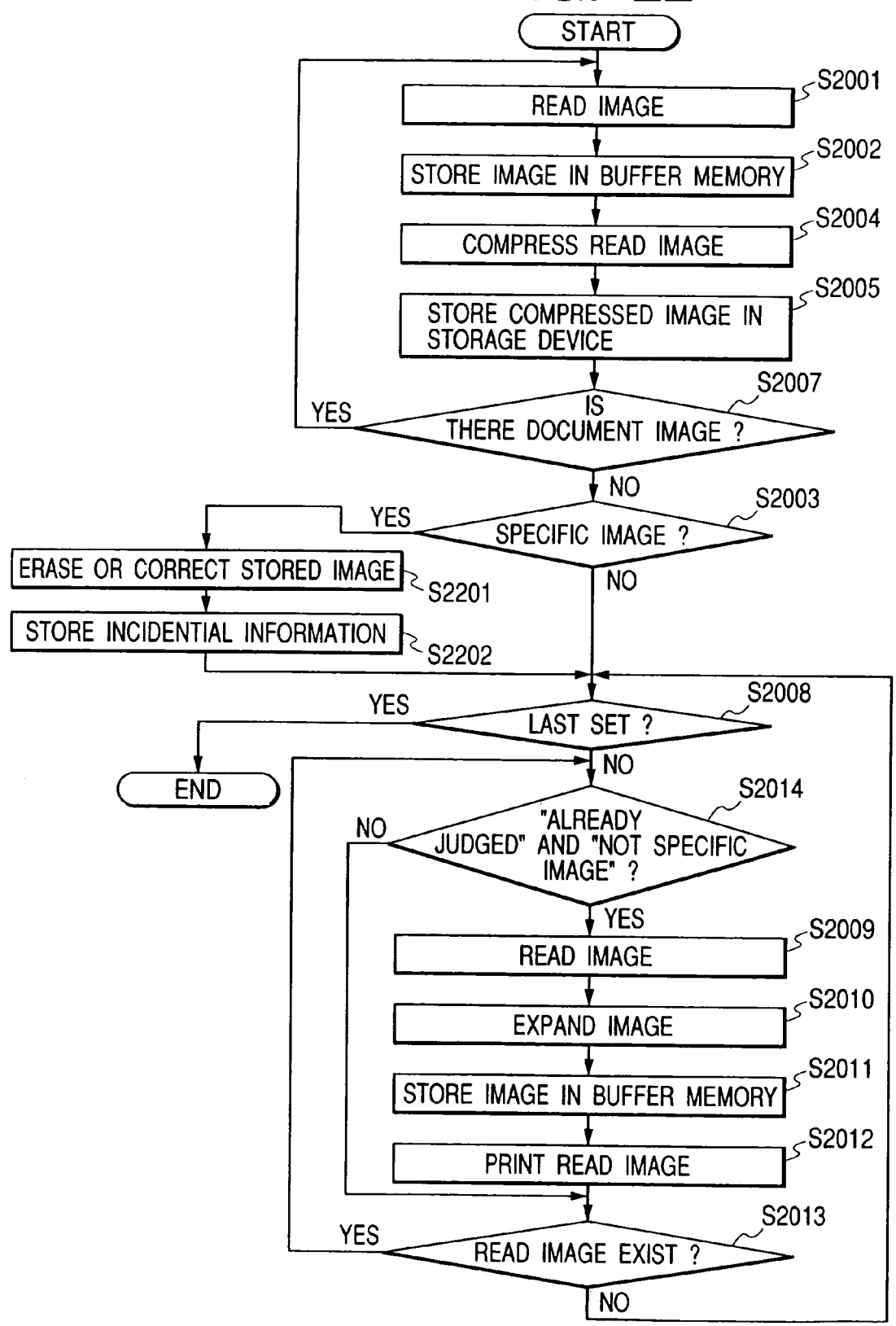
FIG. 22 is a flow chart of a processing program executed in a CPU in an image input/output processing apparatus according to a ninth embodiment.

For the sake of this, the control program shown in FIGS. 20A and 20B is replaced with a control program following a flow chart shown in FIG. 22. This control program shown in FIG. 22 is also stored in the ROM 1913 beforehand, and is read and executed by the system control circuit 1912.

In addition, in the control program shown in FIG. 22, the same reference numerals are assigned to the steps processed similarly to those in the control program shown in FIGS. 20A and 20B, and the detailed description of them will be omitted. Furthermore, since an apparatus operating by the above-described control program shown in FIG. 22 being executed has the same configuration as the above-described image input/output processing apparatus 1900, its detailed description will be omitted.

Only the points different from the eighth embodiment will be concretely described.

First, the system control circuit 1912 reads and executes the control program that is stored in the ROM 1913 and is shown in FIG. 22. Then, the system control circuit 1912 issues an image read instruction to the scanner circuit 1901 through the input/output control circuit 1907. Owing to this, image data is read (step S2001), and stored in the buffer memory circuit 1908 under the control of the input/output control circuit 1907 (step S2002).

Next, the system control circuit 1912 instructs the input/output control circuit 1907 to store the image data, stored at the step S2002 in the buffer memory circuit 1908, in the storage device 1910. Owing to this, the input/output control circuit 1907 reads the image data from the buffer memory circuit 1908, and supplies the image data to the compressing/expanding circuit 1909. The compressing/expanding circuit 1909 compresses the image data, supplied from the input/output control circuit 1907, with a predetermined compression method (step S2004), and stores the image data in the storage device 1910 (step S2005).

Next, the system control circuit 1912 recognizes through the input/output control circuit 1907 whether a next image is read and inputted by the scanner circuit 1901 (step S2006). If there is a next original, the system control circuit 1912 performs such operation control that the processing at and after the step S2001 is repeated.

As described above, after all the image data read by the scanner circuit 1901 is stored in the storage device 1910, the system control circuit 1912 instructs the input/output control circuit 1907 to read the image data stored in the storage device 1910, and supply the image data to the judging circuit 1911. Owing to this by controlling the read out operation of the storage device 1910, the input/output control circuit 1907 supplies one set of image data among image data stored in the storage device 1910 according to the order of storage to the compressing/expanding circuit 1909. The compressing/expanding circuit 1909 expands the image data from the storage device 1910 with a predetermined expansion method. The image data expanded by the compressing/expanding circuit 1909 is supplied to the judging circuit 1911 under the control of the input/output control circuit 1907. The judging circuit 1911 judges whether the image data includes a specific image by judging whether the image data includes specific digital water mark information inserted beforehand. Alternatively, the judging circuit 1911 judges according to a similarity degree whether the image data includes a specific image by extracting characteristics of the image data supplied and comparing the characteristic data with characteristic data of specific images held beforehand (step S2003). This result of judgment in the judging circuit 1911 is supplied to the system control circuit 1912.

The system control circuit 1912 instructs the input/output control circuit 1907 to delete the image data from the storage device 1910 only if the image data includes the specific image according to the result of judgment in the judging circuit 1911. owing to this, the input/output control circuit 1907 deletes the image data from the storage device 1910 (step S2201).

In addition, as described above, if the image data includes the specific image, the image data is deleted from the storage device 1910. Nevertheless, it is also good enough to store information as additional information in the storage device 1910, the information denoting that it is judged that the image data includes the specific image as a result of judgment of whether the image data includes the specific image and is deleted from the storage device 1910 (step S2202). In addition, also if the image data does not include the specific image, it is also good enough to store information as additional information in the storage device 1910, the information denoting that it is judged that the image data does not include the specific image as a result of judgment of whether the image data includes the specific image (step S2202).

By using this additional information, it is possible to easily recognize, for example, whether the input image is intentionally limited.

The above-described judgment processing at the step S2003 and deletion processing at the step S2201 are performed for all the image data stored in the storage device 1910.

Therefore, the storage device 1910 stores only the image data that does not include the specific images.

After that, by each processing at steps S2007 to S2013 being executed, the image data stored in the storage device 1910 is read and printed out by the printer device 1902.

In addition, when printing is performed, additional information stored in the storage device 1910 is referred to beforehand. Therefore, only if it is judged that image data is not equivalent to a specific image in consequence of judging whether the image data is equivalent to a specific image, the image data is printed out. Since the image data judged equivalent to the specific image is deleted from the storage device 1910, the image data is not printed out by the printer device 1902.

Therefore, as described above, in the ninth embodiment, additional information relating to the judgment of whether image data that is inputted from input means is equivalent to a specific image is stored with the image data in memory means. For example, if plural sets of a plurality of originals are copied, it is possible to repeat copying after referring to the additional information. Therefore, it is possible to reduce the load of the judgment processing for forgery prevention. Furthermore, since the judging circuit 1911 is configured so that the input image is deleted from the storage device 1910 if it is judged that the input image is the specific image, it is possible to securely prevent forgery.

In addition, in the above-described ninth embodiment, although images, judged as specific images, among images stored in the storage device 1910 are deleted, this processing is not limited to this. Thus, it is good enough to correct the images judged as specific images, and to store the images in the storage device 1910 again. Therefore, the images corrected are printed out in regard to the images, judged as the specific images, among the images printed out from the printer device 1902. Owing to this, it is possible to securely prevent the forgery.

Tenth Embodiment

In the above-described eighth and ninth embodiments, image data read by the scanner circuit 1901 is printed out by the printer device 1902. Nevertheless, here, PDL data transferred from the host 1906 is developed and printed out by the printer device 1902 (communicating function).

Figure 23:
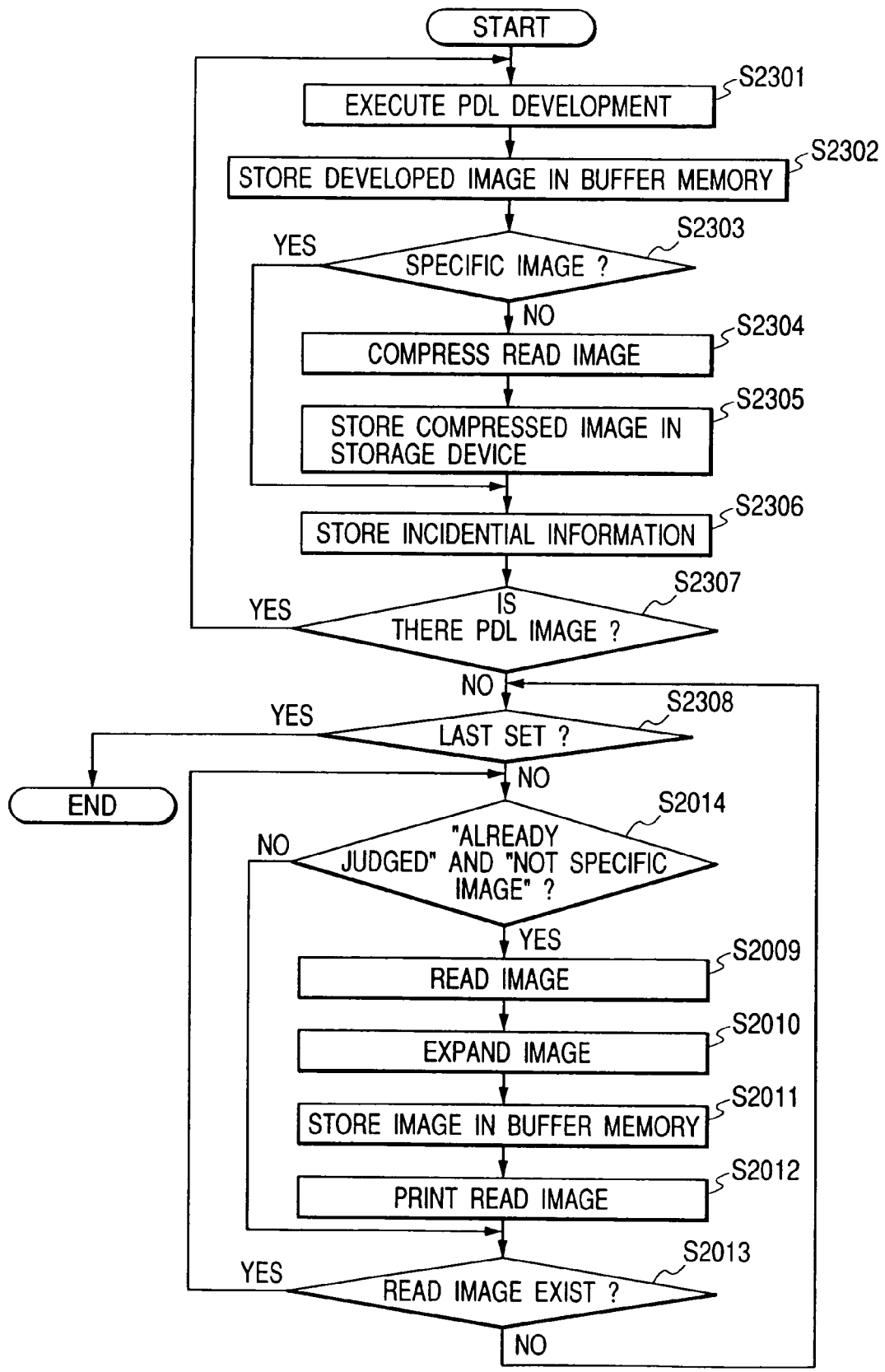
FIG. 23 is a flow chart of a processing program executed in a CPU in an image input/output processing apparatus according to a tenth embodiment.

For the sake of this, for example, the control program shown in FIGS. 20A and 20B is replaced with a control program following a flow chart shown in FIG. 23. This control program shown in FIG. 23 is also stored in the ROM 1913 beforehand, and is read and executed by the system control circuit 1912.

In addition, in the control program shown in FIG. 23, the same reference numerals are assigned to the steps processed similarly to those in the control program shown in FIGS. 20A and 20B, and the detailed description of them will be omitted. Furthermore, since an apparatus operating by the above-described control program shown in FIG. 23 being executed has the same configuration as the above-described image input/output processing apparatus 1900 shown in FIG. 19, its detailed description will be omitted.

Hereinafter, only the points different from the eighth embodiment will be concretely described.

First, the system control circuit 1912 reads and executes the control program that is stored in the ROM 1913 and is shown in FIG. 23. Image data created in the host 1906 is transferred to the PDL circuit 1904 through the interface control circuit 1905 under the control of a common protocol such as SCSI (small Computer System Interface) or TCP (Transmission Control Protocol)/IP (Internet Protocol). The system control circuit 1912 issues a PDL development instruction to the PDL circuit 1904 through the input/output control circuit 1907. Owing to this, the PDL circuit 1904 develops the image data (PDL data: data described in PDL), transferred from the host 1906, into bit map (step S2301).

The image data (developed image), developed into the bit map by the PDL circuit 1904 at the step S2301, is stored in the buffer memory circuit 1908 under the control of the input/output control circuit 1907 (step S2302).

In addition, the image data is also supplied to the judging circuit 1911 under the control of the input/output control circuit 1907. The judging circuit 1911, as described above, judges whether the image data includes a specific image by judging whether the image data includes specific digital water mark information inserted beforehand. Alternatively, the judging circuit 1911 judges according to a similarity degree whether the image data includes a specific image by extracting characteristics of the image data supplied by the input/output control circuit 1907, and comparing the characteristic data with characteristic data of specific images held beforehand (step S2303). This result of judgment in the judging circuit 1911 is supplied to the system control circuit 1912.

The system control circuit 1912 instructs the input/output control circuit 1907 to store the image data, stored at the step S2303 in the buffer memory circuit 1908, in the storage device 1910 if the image data does not include the specific image according to the result of judgment in the judging circuit 1911. Owing to this, the input/output control circuit 1907 reads the image data from the buffer memory circuit 1908 and supplies the image data to the compressing/expanding circuit 1909. The compressing/expanding circuit 1909 compresses the image data, supplied from the input/output control circuit 1907, with a predetermined compression method (step S2304), and stores the image data in the storage device 1910 (step S2305).

In addition, if the image data includes the specific image according to the result of judgment by the judging circuit 1911, the system control circuit 1912 instructs the input/output control circuit 1907 not to perform each processing at the steps 2304 and 2305. Owing to this, in this case, the image data stored in the buffer memory circuit 1908 is not stored in the storage device 1910.

In addition, as described above, if the image data includes the specific image, it is limited to store the image data in the storage device 1910. Nevertheless, it is also good enough to store information as additional information in the storage device 1910, the information denoting that it is judged that the image data includes the specific image as a result of judgment of whether the image data includes the specific image and is not stored in the storage device 1910 (step S2306). In addition, also if the image data does not include the specific image, it is also good enough to store information as additional information in the storage device 1910, the information denoting that it is judged that the image data does not include the specific image as a result of judgment of whether the image data includes the specific image (step S2306).

By using this additional information, for example, it is possible to easily recognize whether an input image is intentionally limited.

After the above-described judgment processing at the step S2303 and the processing according to a result of the judgment is performed, next, the system control circuit 1912 recognizes through the input/output control circuit 1907 whether next image data is transferred from the host 1906 to the PDL circuit 1904 (step S2307). If the next image data is transferred, the system control circuit 1912 performs such operation control that the processing at and after the step S2301 is repeated. At this time, a plurality of image data is stored in the storage device 1910, and an address of each image data is managed by the system control circuit 1912.

As described above, the image data transferred from the host 1906 is stored in the storage device 1910, and the image data judged as the specific image is not stored in the storage device 1910. Thus, only the image data, which does not include the specific image, among image data transferred from the host 1906 is stored in the storage device 1910.

After that, by executing each processing at the steps S2008 to S2013, image data stored in the storage device 1910 is read and printed out by the printer device 1902.

In addition, when printing is performed, additional information stored in the storage device 1910 is referred to beforehand. Therefore, only if it is judged that image data is not equivalent to a specific image in consequence of judging whether the image data is equivalent to the specific image, the image data is printed out. Since the image data judged equivalent to the specific image is not stored in the storage device 1910, the image data is not printed out by the printer device 1902.

Therefore, as described above, in the tenth embodiment, additional information relating to the judgment of whether image data (PDL data) that is transferred from the host 1906 is equivalent to a specific image is stored with the image data in memory means. For example, if plural sets of a plurality of originals are copied, it is possible to repeat copying after referring to the additional information. Therefore, it is possible to reduce the load of the judgment processing for forgery prevention. Furthermore, since the judging circuit 1911 is configured so that the input image is not stored in the storage device 1910 if it is judged that the input image is the specific image, it is possible to securely prevent forgery.

Modified Example of Tenth Embodiment

Figure 26:
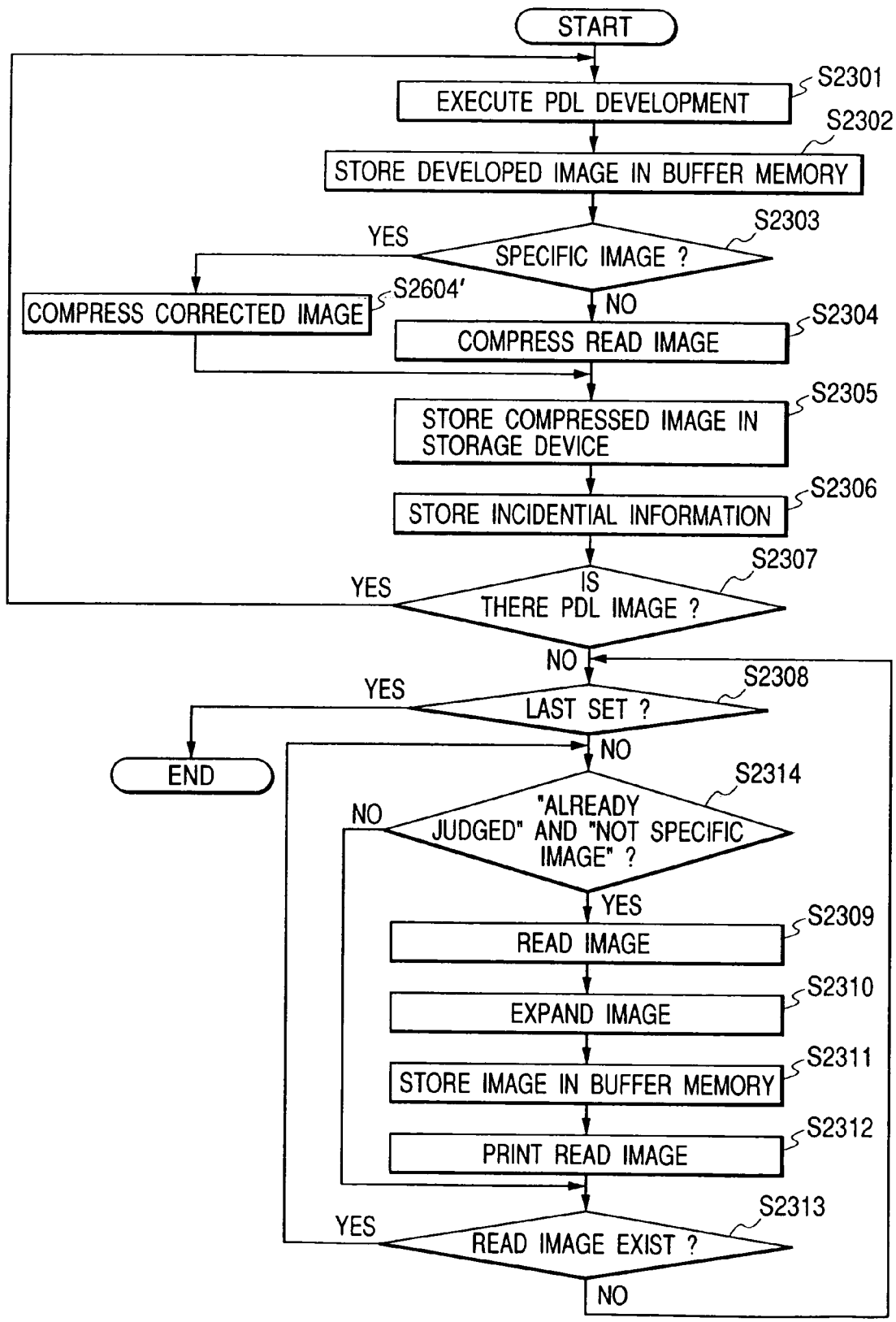
FIG. 26 is a flow chart of a processing program executed in a CPU in an image input/output processing apparatus according to an example of the tenth embodiment.

In addition, in the above-described tenth embodiment, in the control program shown in FIG. 23, if image data transferred from the host 1906 is equivalent to a specific image due to the discrimination processing in step S2303, the image data is not stored in the storage device 1910. Nevertheless, similarly to the eighth embodiment, as shown in FIG. 26, as for the image judged as a specific image it is good enough to perform the processing of producing a corrected image from the image data, and to store the corrected image in the storage device 1910 (step S2604').

Figure 24:
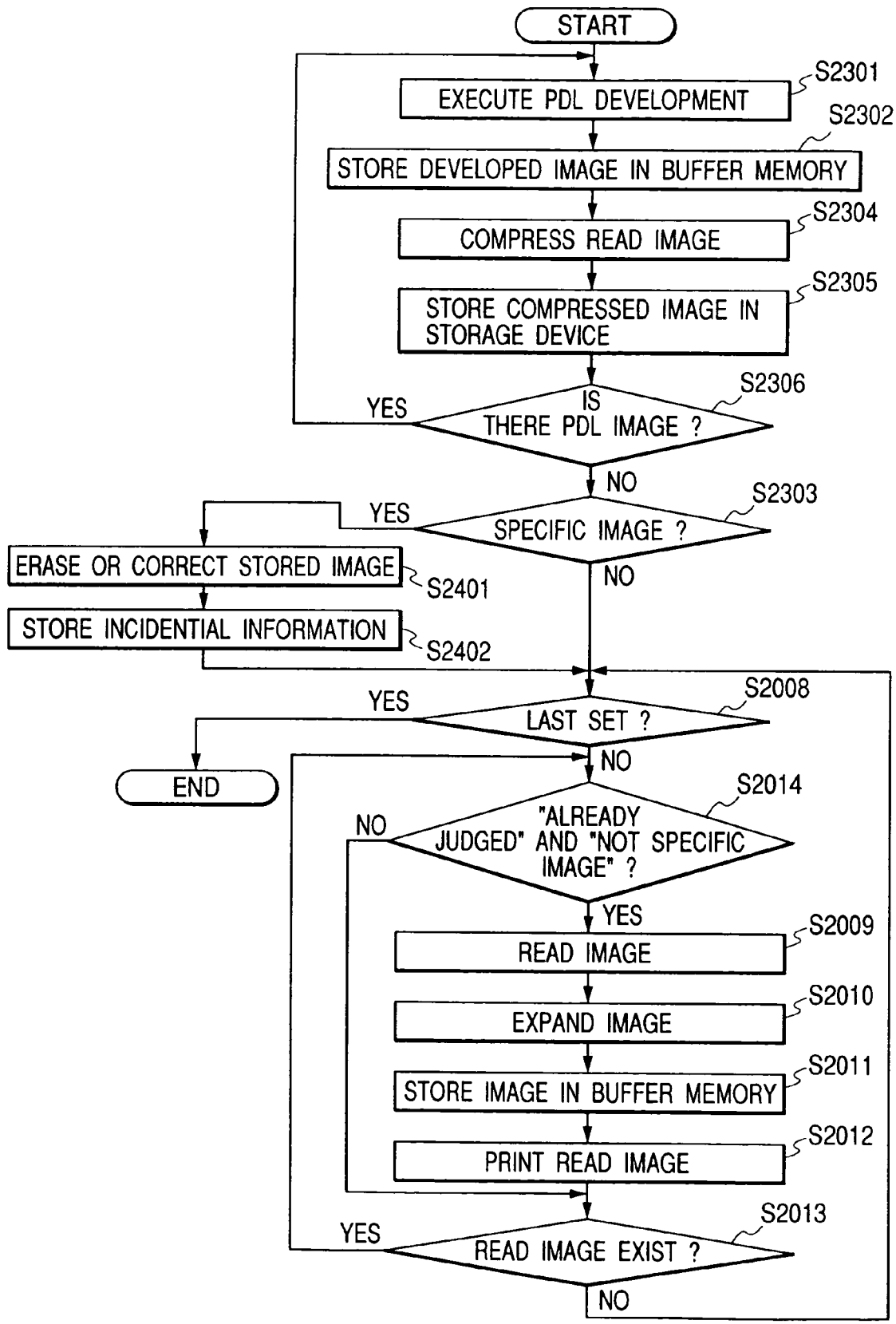
FIG. 24 is a flow chart of a processing program in case of erasing or correcting an input image that is judged to be a specific image.

Furthermore, for example, similarly to the ninth embodiment, as shown in FIG. 24, it is good enough to once store image data transferred from the host 1906 in the storage device 1910, to delete or correct image data, judged equivalent to the specific images, among image data stored (step S2401), and to store additional information in the storage device 1910 (step S2402).

Moreover, in the above-described tenth embodiment, image data transferred from the host 1906 is printed out by the printer device 1902. Nevertheless, this processing is not limited this, but, for example, it is good enough to print out image data (facsimile image data), received by a facsimile circuit 1903, by the printer device 1902 (facsimile function). In this case, with replacing image data, developed into bit map by the PDL circuit 1904, with facsimile image data received by the facsimile circuit 1903, the above-described operation is performed.

In addition, in the above-described tenth embodiment, the judgment processing of specific images is performed for all the image data (PDL data) transferred from the host 1906. Nevertheless, if the judgment processing of specific images has been already performed in the host 1906, it is possible to reduce the load of judgment processing by performing the following judgment processing. Thus, contents of the processing is to perform the judgment processing at the step S2303 for only the image data, which has not been judged yet, through transmitting the additional information, relating to the judgment of whether the image data is equivalent to the specific image, with the image data.

Furthermore, if the judgment processing of specific images is performed in the host 1906, additional information stored in the storage device 1910 is created from the additional information transferred from the host 1906.

Eleventh Embodiment

Next, an eleventh embodiment will be described.

Figure 27:
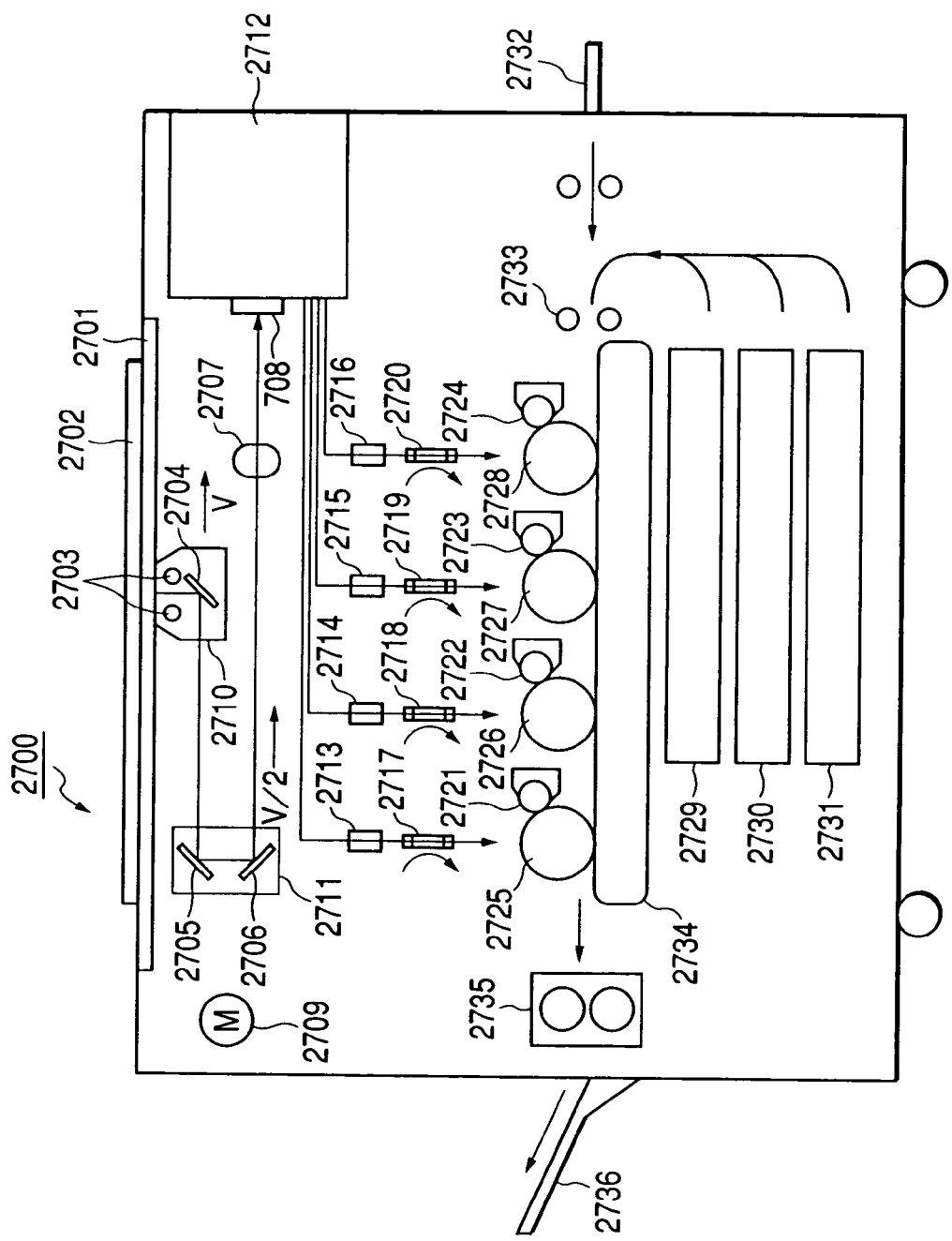
FIG. 27 is a schematic diagram showing the configuration of a color copying machine in an eleventh embodiment.

An image input/output method according to the eleventh embodiment is implemented by, for example, a color copying machine 2700 as shown in FIG. 27.

As shown in FIG. 27, this color copying machine 2700 includes: an original table glass 2701 where an original 2702 to be read is set; an illumination 2703 provided to illuminate the original 2702 set on the original table glass 2701; an optical system 2707; mirrors 2704 to 2706 guiding light from the original 2702 to the optical system 2707; an imaging device 2708 where the light from the optical system 2707 is imaged; a motor 2709 driving a first mirror unit 2710 including the mirror 2704 and illumination 2703, and a second mirror unit 2711 including the mirrors 2705 and 2706, respectively; an image processing circuit 2712 where an output of the imaging device 2708 is supplied; semiconductor lasers 2713 to 2716 where an output of the image processing circuit 2712 is supplied; polygon mirrors 2717 to 2720 where respective outputs of the semiconductor lasers 2713 to 2716 are supplied with corresponding to one another; photoconductive drums 2725 to 2728 where respective outputs of the polygon mirrors 2717 to 2720 are supplied with corresponding to one another; developers 2721 to 2724 supplying toner on the photoconductive drums 2725 to 2728; paper cassettes 2729 to 2731; a manual insertion tray 2732; a transfer belt 2734; a resist roller 2733 guiding paper, delivered from the paper cassettes 2729 to 2731 or manual insertion tray 2732, on the transfer belt 2734; a fixer 2735 fixing the toner, transferred by the photoconductive drums 2725 to 2728, on paper on the transfer belt 2734; and a paper output tray 2736 to output paper toner fixed by a fixer 2735.

The above-described color copying machine 2700 has functions of the above-described image input/output processing apparatus 1900 (FIG. 19). The original table glass 2701, illumination 2703, optical system 2707, imaging device 2708, first mirror unit 2710, second mirror unit 2711, motor 2709, or the like constitute an image reading unit, and correspond to a scanner circuit 1901 in FIG. 19. In addition, the image processing circuit 2712 is a part of outputting an image signal for printing, and corresponds to the input/output control circuit 1907 in FIG. 19, storage device 1910, buffer memory circuit 1908, compressing/expanding circuit 1909, judging circuit 1911, system control circuit 1912, or the like. Furthermore, semiconductor lasers 2713 to 2716, polygon mirrors 2717 to 2720, photoconductive drums 2725 to 2728, paper cassettes 2729 to 2731, manual insertion tray 2732, transfer belt 2734, resist roller 2733, fixer 2735, and paper output tray 2736 are a part of printing out an image, and corresponds to the printer device 1902 in FIG. 19.

Then, first, the original 2702 to be read is set on the original table glass 2701. This original 2702 is illuminated by the illumination 2703, and light reflected from the original 2702 is imaged on the imaging device 2708 by the optical system 2707 through the mirrors 2704 to 2706 sequentially.

At this time, the motor 2709 not only mechanically drives the first mirror unit 2710, including the mirror 2704 and illumination 2703, at the speed of V, but also mechanically drives the second mirror unit 2711, including the mirrors 2705 and 2706, at the speed of V/2. Owing to this, the entire surface of the original 2702 is scanned.

The imaging device 2708 includes a solid imaging device (CCD: Charge Coupled Device), and converts an image, formed by the optical system 2707, into an electric image signal by photoelectric conversion to supply the electric image signal to the image processing circuit 2712.

The image processing circuit 2712 performs predetermined processing of the image signal from the imaging device 2708 to output the image signal as a print signal. As described above, the image processing circuit 2712 performs processing according to a result of judgment of whether the original 2702 includes a specific image. Owing to this, if the original 2702 includes the specific image, the print signal is not outputted, or a print signal after correction processing is outputted.

The semiconductor lasers 2713 to 2716 are driven by the print signal outputted from the image processing circuit 2712. Laser beams emitted by respective semiconductor lasers 2713 to 2716 forms latent images on the photoconductive drums 2725 to 2728 by the polygon mirrors 2717 to 2720.

The developers 2721 to 2724 develop the latent images formed with K, Y, C, and M toner particles on the photoconductive drums 2725 to 2728 respectively.

At this time, paper supplied from any one of the paper cassettes 2729 to 2731 and manual insertion tray 2732 is adsorbed on the transfer belt 2734 through the resist roller 2733, and is delivered.

With synchronizing with the timing of paper supply at this time, respective color toner particles are developed on the photoconductive drums 2725 to 2728, and hence respective color toner particles are transferred on the paper with the delivery of the paper.

The paper where respective color toner particles are transferred is separately delivered from the transfer belt 2734, the color toner particles are fixed by the fixer 2735, and the paper is outputted to the paper output tray 2736.

As described above, by applying the processing in the eighth to tenth embodiments to the color copying machine 2700, additional information relating to the judgment of whether the original 2702 includes a specific image is stored with the image data in memory means. For example, if plural sets of a plurality of originals are copied, it is possible to repeat copying after referring to the additional information. Therefore, it is possible to reduce the load of the judgment processing for forgery prevention. Furthermore, the judging circuit 1911 is configured so that image data is not stored in the storage device 1910 or image data after correction processing is stored if it is judged that the original 2702 includes the specific image. Therefore, the image data is not printed or an image after correction processing is printed. Hence it is possible to securely prevent forgery. In addition, it is possible to provide a color copying machine 2700 having good performance.

Twelfth Embodiment

Next, a twelfth embodiment will be described.

Figure 28:
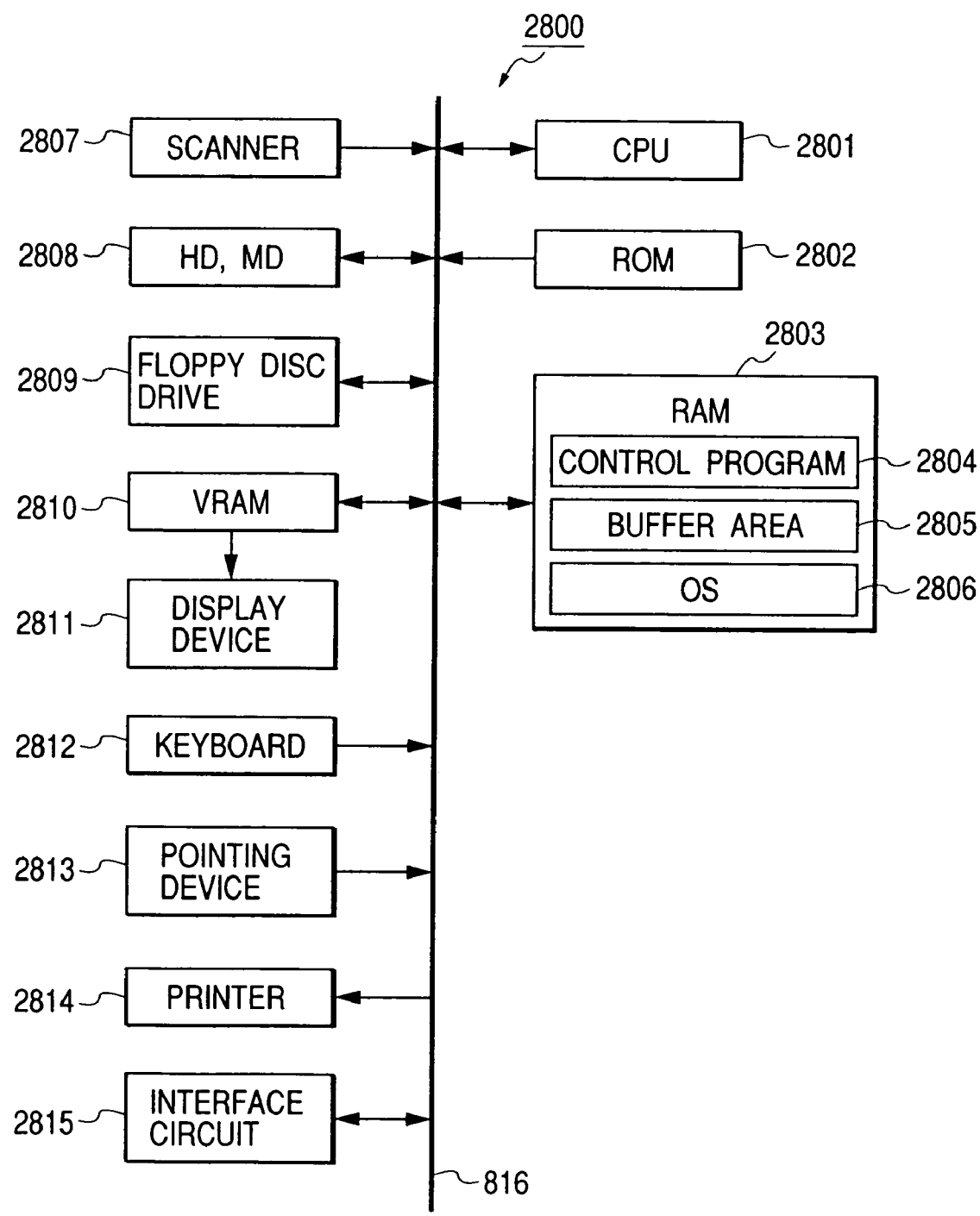
FIG. 28 is a block diagram showing the configuration of an information processing apparatus in a twelfth embodiment.

The eighth to tenth embodiments are implemented by such an information processing apparatus 2800 that is shown in FIG. 28.

As shown in FIG. 28, this information processing apparatus 2800 is configured by connecting a CPU 2801, ROM 2802, RAM 2803, an image scanner 2807, a storage device 2808, a disk drive 2809, VRAM 2810, a display 2811, a keyboard 2812, a pointing device 2813, a printer 2814, and an interface circuit 2815 via a bus 2816 so as to transfer data with one another.

The above-described information processing apparatus 2800 has functions of the image input/output processing apparatus 1900 (FIG. 19), and first, the CPU 2801 performs the operation control of the entire information processing apparatus 2800. This CPU 2801 corresponds to the input/output control circuit 1907, judging circuit 1911, system control circuit 1912, or the like in FIG. 19.

The ROM 2802 stores a boot program, a BIOS (Basic Input/Output System), or the like beforehand. In addition, the RAM 2803 is used as a work area of the CPU 2801, and develops or secures a control program 2804 corresponding to a series of procedure, a buffer area 2805 used for image acquisition and at the time of printing, and an operating system 2806 for performing the operation control of the entire information processing apparatus 2800 with starting with the control program 2804. Then, by the CPU 2801 executing the control program 2804, developed in the RAM 2803, such as control programs shown in FIGS. 20A, 20B, 22, 23, 24, 25A, 25B, and 26, the entire operation control of the information processing apparatus 2800 is performed.

The image scanner 2807 corresponds to the scanner circuit 1901 in FIG. 19, and reads an image.

The storage device 2808 is a large capacity of storage device such as a hard disk apparatus or a magnet-optical disk apparatus, and corresponds to the storage device 1910 in FIG. 19. This storage device 2808 also stores the OS 2806 or the like, which are described above, beforehand.

The disk drive 2809 reads data from a portable recording medium such as a floppy disk. Any one of a floppy disk, set in this disk drive 2809, or the storage device 2808 stores the above-described control program 2804 beforehand. The CPU 2801 reads the control program 2804 and develops it in the RAM 2803.

The VRAM 2810 is used for developing a bit map image displayed on a screen. The display 2811 displays the bit map image developed in this VRAM 2810.

The keyboard 2812 is used for inputting various types of information. The pointing device 2813 is used for pointing a desired position on a display screen of the display 2811 and selecting a desired menu from among various types of menus on a menu screen. Also, according to each input from these keyboard 2812 and pointing device 2813, the CPU 2801 performs the operation control of the entire information processing apparatus 2800.

The printer 2814 corresponds to the printer device 1902 in FIG. 19, and prints out an image or the like that are read by the image scanner 2807.

The interface circuit 2815 corresponds to the interface circuit 1905 in FIG. 19, and connects devices in a network 40 to another host 1906. For example, PDL data transferred from the other host 1906 can be developed into bit map with software processing by the CPU 2801.

As described above, by applying the processing in the eighth to tenth embodiments to a general-purpose information processing apparatus 2800, additional information relating to the judgment of whether the original 2702 includes a specific image is stored with the image data in memory means when, for example, an image read by the image scanner 2807 or an image transferred through the interface circuit 2815 is printed out by the printer 2814. For example, if plural sets of a plurality of originals are copied, it is possible to repeat copying after referring to the additional information. Furthermore, the information processing apparatus is configured so that image data is not stored in the storage device or image data after correction processing is stored if it is judged that the image is the specific image. Therefore, it is possible to reduce the load of the judgment processing for forgery prevention. Furthermore, the information processing apparatus is configured so that image data is not stored in the storage device 1910 or image data after correction processing is stored if it is judged that the original 2702 includes the specific image. Therefore, the image data is not printed or an image after correction processing is printed. Hence it is possible to securely prevent forgery. In addition, it is possible to provide an information processing apparatus 2800 having good performance.

In addition, the processing in the above-described first to tenth embodiments can be applied not only to a data processing method in an apparatus composed of single equipment, but also to a system composed of a plurality of equipment.

Furthermore, the processing in the above-described first to tenth embodiments can be also implemented by supplying a storage medium, storing the program code of the procedure for implementing functions of a host 1906 and a terminal of each embodiment described above, to a system or an apparatus, and by the system or a computer (or CPU, or MPU) of the apparatus reading and executing the program code stored in the storage medium.

In this case, the program code itself read from the storage medium implements the functions of each embodiment described above, and the storage medium storing the program code constitutes the present invention.

It is possible to use ROM, a floppy disk, a hard disk, an optical disk, a magnet-optical disk, CD-ROM, CD-R, a magnetic tape, a nonvolatile memory card, or the like as a storage medium for supplying program code.

In addition, the present invention includes not only a case that functions of each embodiment described above are implemented by a computer executing the program code that the computer reads, but also a case that the functions of each embodiment are implemented by such processing that an OS or the like operating on the computer performs part or all of actual processing.

Furthermore, the present invention also includes a case that, after the program code read from a storage medium is written in memory provided in a feature expansion board inserted into a computer or a feature expansion unit connected to the computer, a CPU or the like that is provided in the feature expansion board or feature expansion unit performs part or all of actual processing, and functions of each embodiment described above are implemented.

As described above, it becomes unnecessary to perform the judgment of a specific image each time image data is outputted by judging whether input image data includes the specific image such as a bank note and storing a fact that judgment has been already performed and its result as additional information of the image data. Owing to this, it is possible to reduce the load of judgment processing of whether the image data includes the specific image, and to rapidly perform the processing.

In particular, in case one image is repeatedly copied, it becomes unnecessary to perform the judgment each time the image is printed, and hence rapid copying can be performed.

In addition, by not outputting image data that has not been judged to include additional information, it is possible to more securely prevent the forgery of an original including a specific image such as a bank note or a security.

Furthermore, by not outputting image data if additional information includes the information denoting that the image data corresponding to the additional information includes a specific image, it is possible to prevent the forgery of an original including the specific image without performing the judgment of the specific image on all such occasions.

Moreover, by informing a user of additional information if the additional information includes the information denoting that the image data corresponding to the additional information includes a specific image, it is possible to give an warning to the user.

In addition, by modifying an image judged to include a specific image and including the information, denoting the fact, in additional information, it is possible to securely prevent the forgery of an original including the specific image.

Furthermore, if the additional information includes the information denoting that the image data corresponding to the additional information is modified, by informing a user of that fact, it is possible to give an warning to the user.

What is claimed is:

1. An image processing apparatus, comprising:
    first receiving means for receiving, from an image generating apparatus having a forgery judging function, a result of judgment by the image generating apparatus having the forgery judging function;
    second receiving means for receiving color image data from any of the image generating apparatus having the forgery judging function and an image generating apparatus not having the forgery judging function, wherein if the color image data is received from the image generating apparatus having the forgery judging function, the color image data is received after receiving the result of judgment by said first receiving means;
    judging means for judging whether a color image composed of the color image data received by said second receiving means is a specific image; and
    output means for outputting the color image data so as to make an image forming unit form a color image by using the color image data received from said second receiving means,
    wherein said image processing apparatus controls formation of the color image according to the result of judgment in the image generating apparatus having the forgery judging function received by said first receiving means if the color image data is generated by the image generating apparatus having the forgery judging function, and controls formation of the color image according to a result of judgment by said judging means if the color image data is generated by the image generating apparatus not having the forgery judging function.

2. The image processing apparatus according to claim 1, wherein the image generating apparatus is a scanner or a digital camera.

3. The image processing apparatus according to claim 1, wherein the specific image is a security such as a bank note, and a traveler's check.

4. The image processing apparatus according to claim 1, wherein said judging means judges the color image data by pattern matching or color matching, or judges digital water mark information included in the color image.

5. The image processing apparatus according to claim 1, wherein said second receiving means receives the color image data via a network.

6. An image processing method, comprising the steps of:
    a first receiving step of receiving, from an image generating apparatus having a forgery judging function, a result of judgment by the image generating apparatus having the forgery judging function, if color image data is generated by the image generating apparatus having the forgery judging function;
    a second receiving step of receiving color image data from any of the image generating apparatus having the forgery judging function and an image generating apparatus not having the forgery judging function, wherein if the color image data is received from the image generating apparatus having the forgery judging function, the color image data is received after receiving the result of judgment in said first receiving step;

judging whether a color image composed of the color image data received by said second receiving step is a specific image; and outputting the color image data so as to make an image forming unit form a color image by using the color image data received in said second receiving step, wherein said image processing method further comprises the steps of controlling formation of the color image according to the result of judgment in the image generating apparatus having the forgery judging function received in said first receiving step if the color image data is generated by the image generating apparatus having the forgery judging function, and controlling formation of the color image according to a result of judgment by said judging step if the color image data is generated by the image generating apparatus not having the forgery judging function.

* * * * *

UNITED STATES PATENT AND TRADEMARK OFFICE
CERTIFICATE OF CORRECTION

| | | |
|---|---|---|
| PATENT NO. | : 7,095,514 B1 | |
| APPLICATION NO. | : 09/628023 | |
| DATED | : August 22, 2006 | |
| INVENTOR(S) | : Shigeo Yamagata et al. | |

It is certified that error appears in the above-identified patent and that said Letters Patent is hereby corrected as shown below:

COLUMN 23:
Line 51, "an" should read --a--.

COLUMN 24:
Line 42, "an" should read --a--.
Line 43, "an" should read --a--.
Line 57, "an" (both occurrences) should read --a--.
Line 63, "is" should read --are--.

COLUMN 26:
Line 27, "owing" should read --Owing--.

COLUMN 27:
Line 49, "(small" should read --(Small--.

COLUMN 30:
Line 22, "with" should be deleted.
Line 25, "with" should be deleted.
Line 52, "corresponds" should read --correspond--.

COLUMN 32:
Line 21, "magnet-optical" should read --magneto-optical--.
Line 39, "these" should read --the--.

COLUMN 33:
Line 25, "magnet-optical" should read --magneto-optical--.

UNITED STATES PATENT AND TRADEMARK OFFICE
CERTIFICATE OF CORRECTION

PATENT NO. : 7,095,514 B1
APPLICATION NO. : 09/628023
DATED : August 22, 2006
INVENTOR(S) : Shigeo Yamagata et al.

It is certified that error appears in the above-identified patent and that said Letters Patent is hereby corrected as shown below:

COLUMN 34:
Line 3, "an" should read --a--.
Line 12, "an" should read --a--.
Line 52, "water" should read --water- --.

Signed and Sealed this

Thirty-first Day of July, 2007

JON W. DUDAS
*Director of the United States Patent and Trademark Office*